(12) United States Patent
Yagi

(10) Patent No.: US 7,220,294 B2
(45) Date of Patent: May 22, 2007

(54) METHOD FOR STORING HYDROGEN, HYDROGEN CLATHRATE COMPOUND AND PRODUCTION METHOD THEREOF

(75) Inventor: Minoru Yagi, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 356 days.

(21) Appl. No.: 10/804,108

(22) Filed: Mar. 19, 2004

(65) Prior Publication Data

US 2004/0230084 A1 Nov. 18, 2004

Related U.S. Application Data

(63) Continuation of application No. PCT/JP03/07318, filed on Jun. 10, 2003.

(30) Foreign Application Priority Data

| Jun. 19, 2002 | (JP) | ............................ 2002-178755 |
| Jan. 31, 2003 | (JP) | ............................ 2003-024590 |

(51) Int. Cl.
*C07C 9/00* (2006.01)
*B01D 53/02* (2006.01)

(52) U.S. Cl. .................. 95/90; 95/149; 423/248.1; 423/648; 502/526

(58) Field of Classification Search ............ 423/248.1, 423/648; 96/108; 95/90, 149; 206/7; 502/526; 252/181.5
See application file for complete search history.

(56) References Cited

U.S. PATENT DOCUMENTS

| 5,082,654 A | | 1/1992 | Sugi et al. |
| 5,091,400 A | * | 2/1992 | Yagi et al. .................. 514/372 |
| 5,523,020 A | * | 6/1996 | Yagi et al. .................. 252/404 |
| 5,703,378 A | | 12/1997 | Shepodd et al. |
| 6,290,753 B1 | * | 9/2001 | Maeland et al. .............. 95/116 |
| 6,309,449 B1 | * | 10/2001 | Klos et al. ..................... 96/108 |
| 6,634,321 B2 | * | 10/2003 | Hussain et al. ................. 123/3 |
| 2002/0020292 A1 | * | 2/2002 | Wojtowicz et al. ........... 95/116 |
| 2003/0089117 A1 | * | 5/2003 | Mao et al. .................... 62/46.1 |

FOREIGN PATENT DOCUMENTS

| JP | 51-87191 | 7/1976 |
| JP | 53-14513 | 5/1978 |
| JP | 2000-210559 | 3/1999 |
| JP | 2001-261301 | 9/2001 |
| JP | 2001-300305 | 10/2001 |
| JP | 2002-106791 | 4/2002 |
| JP | 2002-275673 | 9/2002 |
| WO | 02/48074 | 6/2002 |

OTHER PUBLICATIONS

International Journal of Hydrogen Energy, L.M.Das, vol. 21, P789800, On-board hydrogen storage systems for automotive application (1996.9).
Vos W L et al; "Novel H2-H2O clathrates at high pressures" Physical Revie Letters, American Physical Society, New York, US, vol. 71, No. 19, Nov. 8, 1993, pp. 3150-3153, XP002231837.
DATABASE WPI, Section ch, Week 199012, Derwent Publications Ltd., London, GB; AN1990-087253, XP 002394367, JP02 040304, Feb. 9, 1990.
DATABASE WPI, Section ch, Week 199638, Derwent Publications Ltd., London, GB; An1996-379259, XP-002394368, JP08 183744, Jul. 16, 1996.
Patent Abstract of Japan, vol. 012, No. 248 (C-511), Jul. 13, 1988, JP 63 035533.

\* cited by examiner

*Primary Examiner*—Frank M. Lawrence
(74) *Attorney, Agent, or Firm*—Manabu Kanesaka

(57) ABSTRACT

An organic compound capable of forming a hydrogen molecular compound such as a hydrogen clathrate is brought in contact with hydrogen gas in a pressurized state. It enables relatively light-weight and stable storage of hydrogen at or near the ordinary temperature and the ambient pressure and easy takeoff of the stored hydrogen.

33 Claims, 16 Drawing Sheets

US 7,220,294 B2

METHOD FOR STORING HYDROGEN, HYDROGEN CLATHRATE COMPOUND AND PRODUCTION METHOD THEREOF

CROSS REFERENCE TO RELATED APPLICATION

This is a continuation application of PCT/JP03/07318 filed on Jun. 10, 2003.

FIELD OF THE INVENTION

The present invention relates to a method for storing hydrogen capable of achieving the relatively light-weight and stable storage of hydrogen at or near the ordinary temperature and the ambient pressure and allowing easy takeoff of the stored hydrogen and also to a hydrogen clathrate which contains hydrogen and a production method thereof.

BACKGROUND OF THE INVENTION

Recently, new clean energy systems in which hydrogen is used as an energy medium have been proposed as a countermeasure against global environmental problems due to emission of $CO_2$. Among such energy systems, fuel cell is based on an energy conversion technology of taking electric energy out of hydrogen and oxygen by converting chemical energy, produced when hydrogen and oxygen react with each other to form water, into electric energy. This technology draws attention as the most important next-generation technology to be used as a power source alternative to gasoline engine for vehicles, an on-site electric generator for household use, and a DC power supply for IT (information technology) use.

However, the biggest problems of the hydrogen fuel are storage and transport thereof.

There are various methods have been proposed as method for storing hydrogen. As one of the methods, there is a method of storing hydrogen in gaseous phase into a high-pressure gas cylinder. This storage at high pressure is simple, but requires a container having thick wall. Accordingly, the container is so heavy that the efficiency of storage and transport is poor. Therefore, for example, the application to automobiles is difficult because weight saving counts in automobile manufacture. On the other hand, in case of storing hydrogen in liquid phase, the efficiency of storage and transport is improved as compared to the storage in gaseous phase. However, high-purity hydrogen is required to make the hydrogen in liquid phase and a special container capable of withstanding cryogenic temperature because the temperature of liquefaction process is an extremely low temperature of −252.6° C. That is, there is economical problem. There is another proposal of using hydrogen storage alloy. However, there are problems that the alloy itself is heavy and that, in case of Mg based hydrogen storage alloy having lighter weight, the temperature for emitting stored hydrogen is high near 300° C. There is further another proposal of using porous carbon material such as carbon nanotube. However, there are a lot of problems that the repeatability of hydrogen storage is low, that the storage under high pressure condition is required, that it is difficult to manufacture carbon nanotubes, and the like.

It is an object of the present invention to provide a method of storing hydrogen to be useful as a novel storage and transport method capable of solving the aforementioned problems of the prior art, and capable of achieving the relatively light-weight and stable storage of hydrogen at or near the ordinary temperature and the ambient pressure and allowing easy takeoff of the stored hydrogen.

It is another object of the present invention to provide a hydrogen clathrate to be useful as a novel storage and transport method capable of solving the aforementioned problems of the prior art, and which is relatively light weight and can store hydrogen at or near the ordinary temperature and the ambient pressure and to provide a production method thereof.

SUMMARY OF THE INVENTION

The method for storing hydrogen of the present invention is characterized in that organic compound is brought into contact with hydrogen gas in a pressurized state.

Organic compounds which can be used in the present invention do not include organic compounds consisting of carbon atoms only such as graphite, carbon nanotube, and fullerene and include organic metallic compounds containing metallic component. The organic compound is basically solid, but may be liquid if it can enclose hydrogen in the pressurized state. In case of solid organic compound, it may be in crystalloid form or in amorphous form.

Through hard studies about method for storing hydrogen, the inventor of this invention found that easy storage of hydrogen can be achieved by bringing hydrogen gas into contact with the organic compound in a pressurized state to form a hydrogen molecular compound which is relatively light weight and can stably hold hydrogen at or near the ordinary temperature and the ambient pressure.

The molecular compound used in the present invention means a compound composed of two or more kinds of compounds each of which can stably exist alone in which such compounds are combined by relatively weak interaction, other than covalent bond, as typified by hydrogen bond and van der Waals force. Examples of such compounds include hydrate, solvate, addition compound, and clathrate. The hydrogen molecular compound as mentioned above can be formed by bringing organic compound capable of forming a hydrogen molecular compound into contact with hydrogen under a pressurized condition so as to react. The hydrogen molecular compound is relatively light weight and can store hydrogen at or near the ordinary temperature and the ambient pressure and allows emission of hydrogen therefrom by a simple method such as heating.

The hydrogen molecular compound according to the present invention may be a hydrogen clathrate in which hydrogen molecules are enclosed by contact reaction between organic compound and hydrogen molecules.

The hydrogen clathrate of the present invention is characterized in that hydrogen is enclosed by contact reaction between host compound and hydrogen.

By the contact reaction between host compound and hydrogen, the hydrogen can be selectively and stably enclosed in the host compound so that the hydrogen can be stored at the ordinary temperature and the ambient pressure and the stored hydrogen can be emitted at a relatively low temperature.

In the present invention the host compound is preferably a host compound of multimolecular type, especially a phenol type host compound or an imidazole type host compound.

A production method of a hydrogen clathrate of the present invention is characterized by dissolving a host compound into a solvent, recrystallizing the host compound with injecting hydrogen into the solvent, and inserting hydrogen molecules into crystal lattice of the host compound. According to this method, the hydrogen clathrate in which hydrogen is enclosed into the host compound can be effectively produced at the ordinary temperature and the ambient pressure.

A production method of a hydrogen clathrate according to another embodiment of the present invention is characterized by bringing hydrogen gas into contact with a host compound in a pressurized state.

DESCRIPTION OF THE PREFERRED EMBODIMENTS

[Description of Method for Storing Hydrogen]

Figure 1:
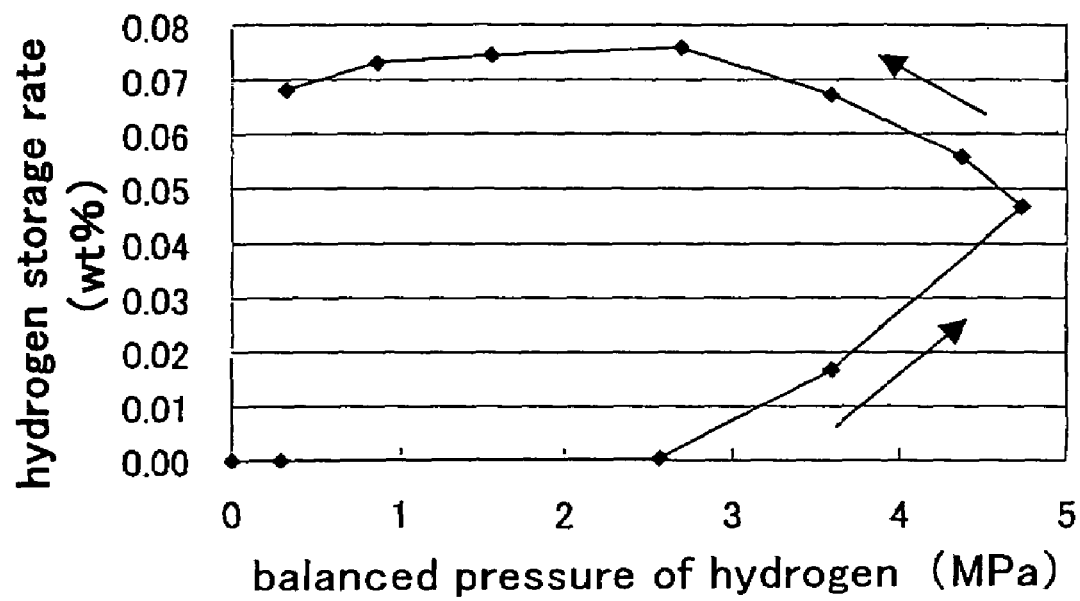
FIG. 1 is a graph showing the evaluation result of hydrogen storage performance of BHC in Example 1.

Hereinafter, a preferred embodiment of the method of hydrogen storage of the present invention will be described in detail.

In the present invention, an organic compound used in hydrogen storage may be any one of organic compounds capable of storing hydrogen when it is in contact with hydrogen gas under pressurized condition, except organic compounds consisting of carbon atoms only. Other than that, there is no particular limitation on the organic compound used in hydrogen storage. The organic compound may contain metallic component and may not contain metallic component.

Among hydrogen molecular compounds, known as organic compounds forming hydrogen clathrates containing hydrogen molecules are host compounds of monomolecular type, multimolecular type, high-molecular type, and the like.

Examples of host compounds of monomolecular type include cyclodextrins, crown ethers, cryptands, cyclophanes, azacyclophanes, calixarenes, cyclotriveratrylenes, spherands, and cyclic oligopeptides. Examples of host compounds of multimolecular type include ureas, thioureas, deoxycholates, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakis phenol-base, polyphenols, naphthols, bis-naphthols, diphenylmehanols, carboxylic amides, thioamides, bixanthene, carboxylic acids, imidazoles, and hydroquinones. Examples of host compounds of high-molecular type include celluloses, starchs, chitins, chitosans, and polyvinyl alcohols, polymers of polyethylene glycol arm type of which core is 1,1,2,2-tetrakis phenyl ethane, and polymers of polyethylene glycol arm type of which core is $\alpha,\alpha,\alpha',\alpha'$-tetrakis phenyl xylene.

Other than those, examples of host compounds may also include organic phosphorous compounds and organic silicon compounds.

Further, some of organic metallic compounds have characteristics functioning as host compound and include, for examples, organic aluminum compounds, organic titanium compounds, organic boron compounds, organic zinc compounds, organic indium compounds, organic gallium compounds, organic tellurium compounds, organic tin compounds, organic zirconium compounds, and organic magnesium compounds. Further, a metallic salt of organic carboxylic acid or an organic metallic complex may be employed. However, organic metallic compounds are not limited to those listed above.

Among the above host compounds, host compounds of multimolecular type of which enclosure capacity is hardly influenced by the size of molecules of guest compound are preferable.

Concrete examples of host compounds of multimolecular type are urea, 1,1,6,6-tetraphenyl-2,4-hexadiyn-1,6-diol, 1,1-bis(2,4-dimethylphenyl)-2-propyn-1-ol, 1,1,4,4-tetraphenyl-2-butyne-1,4-diol, 1,1,6,6-tetrakis(2,4-dimethylphenyl)-2,4-hexadiyn-1,6-diol, 9,10-diphyenyl-9,10-dihydroanthracene-9,10-diol, 9,10-bis(4-methylphenyl)-9,10-dihydroanthracene-9,10-diol, 1,1,2,2-tetraphenylethane-1,2-diol, 4-methoxyphenol, 2,4-dihydroxybenzophenone, 4,4,-dihydroxybenzophenone, 2,2'-dihydroxybenzophenone, 2,2',4,4'-tetrahydroxybenzophenone, 1,1-bis(4-hydroxyphenyl)cyclohexane, 4,4'-sulfonyl bisphenol, 2,2'-methylene bis (4-methyl-6-t-buthylphenol), 4,4'-ethylidene bisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis(3-fluoro-4-hydroxyphenyl)ethane, α,α,α',α'-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetra acetoxy-9,9'-bi-9H-xanthene, 3,6,3',6'-tetrahydroxy-9,9'-bi-9H-xanthene, gallic acid, methyl gallate, catechin, bis-β-naphthol, α,α,α',α'-tetraphenyl-1,1'-biphenyl-2,2'-dimethanol, bis-dicyclohexylamide diphenirate, bis-dicyclohexylamide fumarate, cholic acid, deoxycholic acid, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis (3-carboxyphenyl)ethane, acetylene dicarboxyl acid, 2,4,5-triphenyl imidazole, 1,2,4,5-tetraphenyl imidazole, 2-phenyl phenanthro[9,10-d]imidazole, 2-(o-cyanophenyl)phenanthro[9,10-d]imidazole, 2-(m-cyanophenyl)phenanthro[9,10-d]imidazole, 2-(p-cyanophenyl)phenanthro[9,10-d]imidazole, hydroquinone, 2-t-butyl hydroquinone, 2,5-di-t-butyl hydroquinone, and 2,5-bis(2,4-dimethylphenyl)hydroquinone. Among these, especially preferably employed host compounds in view of enclosure capacity are phenol-based host compounds such as 1,1-bis(4-hydroxyphenyl)cyclohexane, 1,1,2,2-tetrakis(4-hydroxyphenyl)ethane, and 1,1,2,2-tetrakis(4-hydroxyphenyl)ethylene; aromatic host compounds such as tetrakis(p-methoxyphenyl)ethylene, tetrakis(p-iodophenyl)ethylene, 9,9'-bianthryl and 1,1,2,2-tetraphenylethane; amide-based host compounds such as bis(dicyclohexylamide)diphenirate and bis-dicyclohexylamide fumarate; alcohol-based host compounds such as (α,α,α',α'-tetraphenyl-1,1'-biphenyl-2,2'-dimethanol and 1,1,6,6-tetraphenyl-2,4-hexadiyn-1,6-diol; and imidazole-based host compounds such as 2-(m-cyanophenyl)phenanthro[9,10-d]imidazole; and organic phosphorous compound such as tri-m-trylphosphine.

These host compounds may be used alone or may be used in combination with one or more among the others.

It is particularly preferable that the organic compound to be used is solid in powder form in view of contact efficiency with hydrogen gas. However, the organic compound is not limited thereto and may be in granular form or in aggregated form and also may be in crystalloid form or in amorphous form. Further, the organic compound may be liquid or gaseous. When the organic compound is solid in powder form, there is no particular limitation on it particle diameter, but normally the particle diameter is preferably about 1 mm or less.

The organic compound may be used to be a complex material containing the organic compound supported on a porous carrier or support. In this case, examples of the porous carrier supporting the organic compound include, but not limited to, silicas, zeolites, or activated carbons, alternatively, interlaminar compounds such as a clay mineral or montmorillonite. The complex material containing the organic compound can be manufactured by, for example, a method of dissolving the organic compound in a solvent capable of dissolving the organic compound, impregnating the porous carrier with the organic compound solution, drying the solvent, and decompressing and drying them. There is no limitation on the amount of the organic material supported on the porous carrier. However, the amount of the organic material is normally in a range from 10 to 80% by weight relative to the porous carrier.

It is known that the aforementioned host compound such as 1,1-bis(4-hydroxyphenyl)cyclohexane or bis(dicyclohexylamide)diphenirate receives various guest molecules to form a crystal clathrate. It is also known that a clathrate is formed by bringing the host compound in contact with a guest compound (may be solid, liquid, or gaseous). In the present invention, the gaseous molecular of hydrogen gas is brought in contact with the organic compound as the host compound in the pressurized state so that hydrogen molecules are enclosed in the clathrate, thereby stably storing hydrogen.

As for the pressurizing condition under which hydrogen gas and solid organic compound are in contact with each other, higher pressure is preferable because larger storage amount and higher storage speed of hydrogen are possible. On the other hand, the pressurizer should be expensive and, in addition, it should be required to satisfy the regulations of High Pressure Gas Safety Law. Normally, the pressurizing condition is higher than the $1.0 \times 10^{-10}$ MPa and is preferably in a range from $1.0 \times 10^{-10}$ MPa to 200 MPa. It is more preferably higher than the ambient pressure by 0.1 MPa to 70 MPa, actually especially by 0.1 to 0.9 MPa.

As the contact time is longer, the hydrogen storage rate can be increased. In view of working efficiency, the contact time is preferably in a range from 0.01 to 24 hours.

The hydrogen gas to be brought in contact with the organic compound is preferably high-purity hydrogen. However, as will be described below, it may be a mixed gas of hydrogen gas and other gas in case of using host compound having selective enclosure capacity of hydrogen.

A hydrogen clathrate obtained as mentioned above is a hydrogen clathrate normally having hydrogen molecules from 0.1 to 20 moles relative to 1 mole of the host compound, but somewhat depends on the kind of used host compound and the contact condition with hydrogen.

Such a hydrogen clathrate as mentioned above can stably enclose hydrogen for a long period of time at ordinary temperature and ambient pressure. Moreover, the hydrogen clathrate is light as compared to hydrogen storage alloy and thus has excellent handling-property. In addition, since the hydrogen clathrate is solid, the hydrogen clathrate can be in powder form having particle diameter of 1 mm or less and thus can be easily stored and transported in a container made of glass, metal, or plastic.

According to the method of the present invention, in case that hydrogen is stored in the pressurized state, the hydrogen can be taken off from the stored state by depressurizing or heating. The hydrogen can be taken off from the stored state also by heating and depressurizing at the same time.

Particularly, hydrogen can be emitted from the hydrogen clathrate by heating the hydrogen clathrate to a temperature in a range from 30° C. to 200° C., particularly in a range from 40° C. to 100° C. under ambient pressure or a reduced pressure lower than the ambient pressure by $1.0 \times 10^{-2}$ MPa to $1.0 \times 10^{-5}$ MPa, but the condition somewhat depends on the kind of the host compound. Therefore, hydrogen can be easily emitted from the hydrogen clathrate and used for various applications.

The host compound after the hydrogen is emitted from the hydrogen clathrate still has the selective enclosure capacity of hydrogen so that it is effectively reusable.

The method for storing hydrogen of the present invention will be described in detail with reference to Examples. In Examples 1–19, evaluation test of hydrogen storage property was conducted according to the following method.

<Evaluation Test of Hydrogen Storage property>

1) Evaluation Method

According to Japan Industrial Standard (JIS) H-7201 entitled "Method of termining the PCT relations of hydrogen absorbing alloys", the measurement was conducted by using a hydrogen emission evaluation equipment available from LESCA CORPORATION.

2) Specimen

A test tube having volume of 25 ml was filled with specimen of about 0.1 g to 1 g, and the weight of the specimen was measured precisely. The test tube was then filled with helium gas, and was measured its airtightness for more than 12 hours. It was found to have enough airtightness. After that, the inner volume of the tube other than the specimen was detected.

3) Pretreatment

The specimen was heated to 50° C. and was vacuumed and depressurized for 3 hours by a rotary pump.

4) Evaluation Condition

The test tube filled with the specimen was retained in a temperature-controlled bath at 25° C. during the test. Hydrogen gas was introduced with changing the pressure to balance the pressure. When the pressure was balanced, the storage amount was measured. The measurement was conducted under such a condition that the retention time at each balanced pressure was 1 hour or 8 hours.

EXAMPLE 1

0.5602 g of 1,1-bis(4-hydroxyphenyl)cyclohexane (hereinafter, referred to as "BHC") in solid power state was prepared as a specimen. The specimen was evaluated according to the aforementioned test method under such a condition that the retention time at each pressure was 1 hour. The relation between the balanced pressure and the hydrogen storage rate was shown in Table 1 and FIG. 1.

TABLE 1

Evaluation Results of Hydrogen Storage Capacity of BHC
(25° C.; Retention time at each pressure: 1 hour)

| Balanced Pressure (MPa) | Hydrogen Storage Rate (wt %) |
|---|---|
| 0.00001 | 0 |
| 0.28512 | 2.72E−05 |
| 2.56316 | 5.06E−04 |
| 3.58284 | 1.70E−02 |
| 4.74355 | 4.69E−02 |
| 4.37443 | 5.58E−02 |
| 3.59104 | 6.71E−02 |
| 2.69834 | 7.58E−02 |
| 1.54989 | 7.46E−02 |
| 0.85812 | 7.30E−02 |
| 0.31544 | 6.83E−02 |

From the results shown in Table 1 and FIG. 1, it was found that the hydrogen storage rate was increased as the hydrogen pressure was increased. Even when the pressure was reduced from near 5 MPa, the storage rate is not lowered. From this, it was found that the hydrogen storage is achieved not only by physical absorption. This is attributed to the fact that hydrogen molecules are enclosed into the solid BHC so as to form hydrogen clathrate.

We confirmed that stored hydrogen can be emitted under condition of 50° C. and the ambient pressure or under condition of a reduced pressure (0.005 MPa).

EXAMPLE 2

0.2361 g of the BHC in solid power state, used in Example 1, of which hydrogen was emitted was prepared as a specimen. The specimen was evaluated according to the aforementioned test method under such a condition that the retention time at each pressure was 8 hour. The relation between the balanced pressure and the hydrogen storage rate was shown in Table 2 and FIG. 2.

TABLE 2

Evaluation Results of Hydrogen Enclosure Capacity of BHC
(25° C.; Retention time at each pressure: 8 hour)

| Balanced Pressure (MPa) | Hydrogen Storage Rate (wt %) |
|---|---|
| 0.00001 | 0 |
| 0.26998 | 8.99E−03 |
| 0.75076 | 2.43E−02 |
| 1.54598 | 4.25E−02 |
| 2.48468 | 7.11E−02 |
| 3.42314 | 1.08E−01 |
| 4.40393 | 1.39E−01 |
| 5.98982 | 2.53E−01 |
| 8.9985 | 2.86E−01 |
| 7.7586 | 3.41E−01 |
| 6.08094 | 3.93E−01 |
| 4.8332 | 3.57E−01 |
| 3.70449 | 3.72E−01 |
| 2.47191 | 3.99E−01 |
| 1.58845 | 4.09E−01 |
| 0.8876 | 4.11E−01 |
| 0.33885 | 4.02E−01 |

Figure 2:
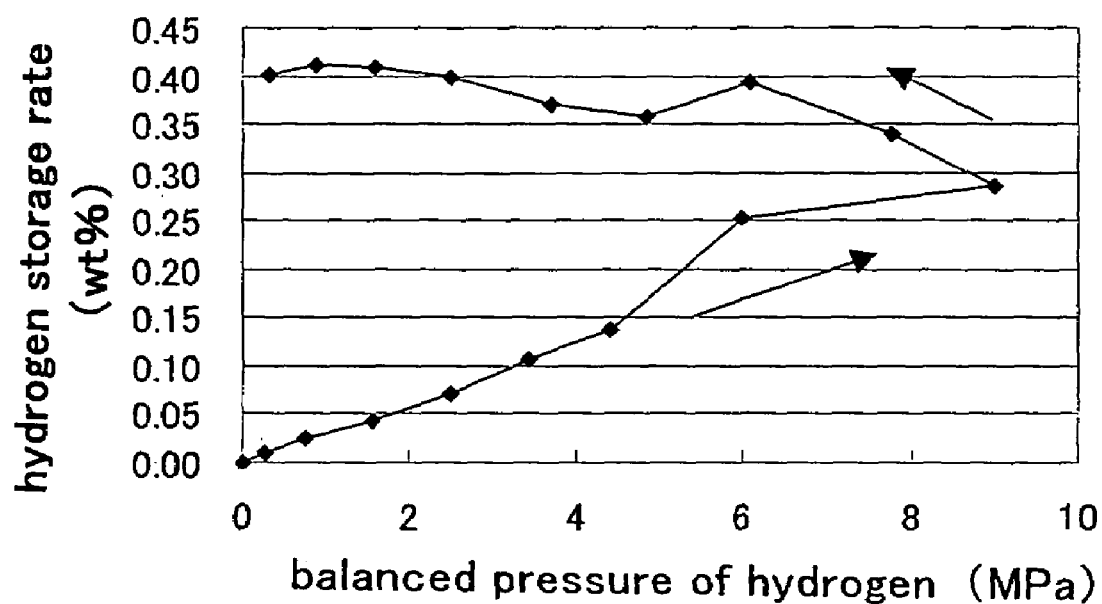
FIG. 2 is a graph showing the evaluation result of hydrogen storage performance of BHC in Example 2.

From the results shown in Table 2 and FIG. 2, it was found that the hydrogen storage rate in case that the retention time was 8 hours was increased as compared to the case that the retention time was 1 hour.

We confirmed that stored hydrogen can be emitted under condition of 50° C. and the ambient pressure or under condition of a reduced pressure (0.005 MPa). It is found from this that the method for storing hydrogen of the present invention enables repetition of enclosure and emission of hydrogen.

EXAMPLE 3

0.5897 g of 9,9'-bianthryl (hereinafter, referred to as "BA") in solid power state was evaluated according to the aforementioned test method under such a condition that the retention time at each pressure was 1 hour. The relation between the balanced pressure and the hydrogen storage rate was shown in Table 3 and FIG. 3.

TABLE 3

Evaluation Results of Hydrogen Storage Capacity of BA
(25° C.; Retention time at each pressure: 1 hour)

| Balanced Pressure (MPa) | Hydrogen Storage Rate (wt %) |
|---|---|
| 0.00001 | 0 |
| 0.29628 | 2.51E−03 |
| 0.76323 | 1.99E−03 |
| 1.56556 | 1.34E−03 |
| 2.4644 | 5.50E−05 |
| 3.44561 | 4.59E−04 |
| 4.42035 | 7.60E−03 |
| 7.83902 | 2.44E−02 |
| 6.06874 | 3.10E−02 |

TABLE 3-continued

Evaluation Results of Hydrogen Storage Capacity of BA
(25° C.; Retention time at each pressure: 1 hour)

| Balanced Pressure (MPa) | Hydrogen Storage Rate (wt %) |
|---|---|
| 4.80743 | 3.93E−02 |
| 3.72473 | 4.50E−02 |
| 2.67821 | 4.41E−02 |
| 1.65635 | 4.55E−02 |
| 0.97333 | 4.55E−02 |
| 0.4255 | 4.32E−02 |
| 0.15678 | 4.48E−02 |

Figure 3:
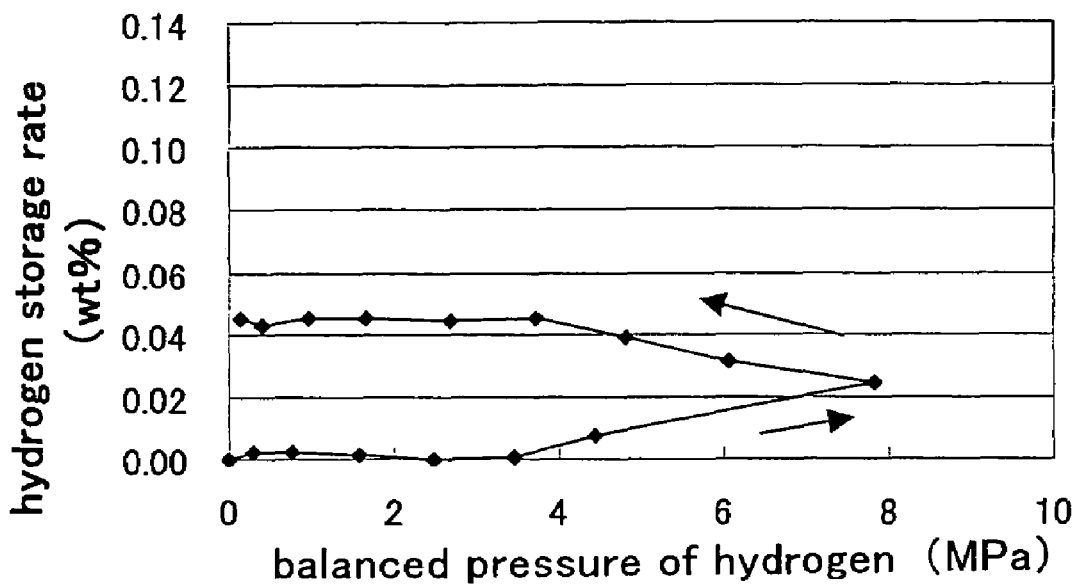
FIG. 3 is a graph showing the evaluation result of hydrogen storage performance of BA in Example 3.

From the results shown in Table 3 and FIG. 3, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid BA so as to form hydrogen clathrate.

We confirmed that stored hydrogen can be emitted under condition of 50° C. and the ambient pressure or under condition of a reduced pressure (0.005 MPa).

EXAMPLE 4

0.523 g of 1,1,2,2-tetrakis (4-hydroxyphenyl) ethylene (hereinafter, referred to as "THPEY") in solid power state was evaluated according to the aforementioned test method under such a condition that the retention time at each pressure was 1 hour. The relation between the balanced pressure and the hydrogen storage rate was shown in Table 4 and FIG. 4.

TABLE 4

Evaluation Results of Hydrogen Storage Capacity of THPEY
(25° C.; Retention time at each pressure: 1 hour)

| Balanced Pressure (MPa) | Hydrogen Storage Rate (wt %) |
|---|---|
| 0.00001 | 0 |
| 0.2859 | 2.86E−03 |
| 0.75946 | 2.51E−03 |
| 1.56681 | 4.67E−03 |
| 2.48916 | 7.66E−03 |
| 3.42975 | 1.87E−02 |
| 4.40985 | 2.89E−02 |
| 7.91528 | 4.98E−02 |
| 6.1531 | 5.87E−02 |
| 4.86329 | 6.50E−02 |
| 3.73287 | 7.12E−02 |
| 2.78108 | 7.30E−02 |
| 1.68593 | 7.43E−02 |
| 0.91052 | 7.20E−02 |
| 0.39254 | 7.04E−02 |
| 0.05198 | 6.90E−02 |

Figure 4:
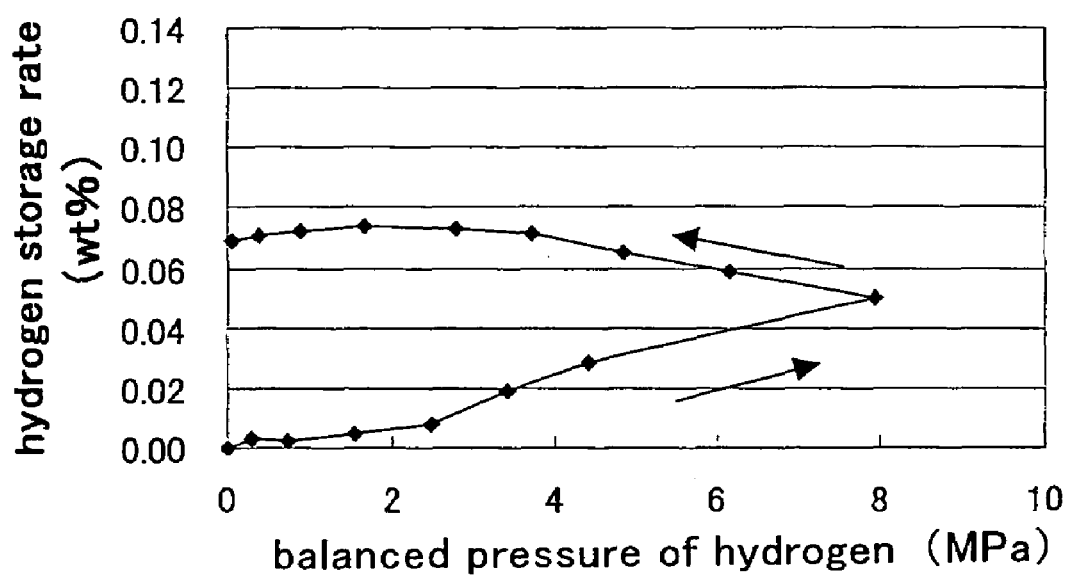
FIG. 4 is a graph showing the evaluation result of hydrogen storage performance of THPEY in Example 4.

From the results shown in Table 4 and FIG. 4, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid THPEY so as to form hydrogen clathrate.

We confirmed that stored hydrogen can be emitted under condition of 50° C. and the ambient pressure or under condition of a reduced pressure (0.005 MPa).

EXAMPLE 5

0.510 g of tetrakis(p-methoxyphenyl)ethylene (hereinafter, referred to as "TMPE") in solid power state was evaluated according to the aforementioned test method under such a condition that the retention time at each pressure was 1 hour. The relation between the balanced pressure and the hydrogen storage rate was shown in Table 5 and FIG. 5.

TABLE 5

Evaluation Results of Hydrogen Storage Capacity of TMPE
(25° C.; Retention time at each pressure: 1 hour)

| Balanced Pressure (MPa) | Hydrogen Storage Rate (wt %) |
|---|---|
| 0.00001 | 0 |
| 0.34802 | 2.00E−03 |
| 0.77991 | 1.34E−04 |
| 1.556 | 8.87E−04 |
| 2.47892 | 1.06E−03 |
| 3.43927 | 8.98E−04 |
| 4.41114 | 2.49E−04 |
| 7.82444 | 1.43E−02 |
| 6.03258 | 2.48E−02 |
| 4.77365 | 3.11E−02 |
| 3.66555 | 3.66E−02 |
| 2.6391 | 4.19E−02 |
| 1.62859 | 4.20E−02 |
| 0.93906 | 4.13E−02 |
| 0.41354 | 3.89E−02 |
| 0.15272 | 3.90E−02 |

Figure 5:
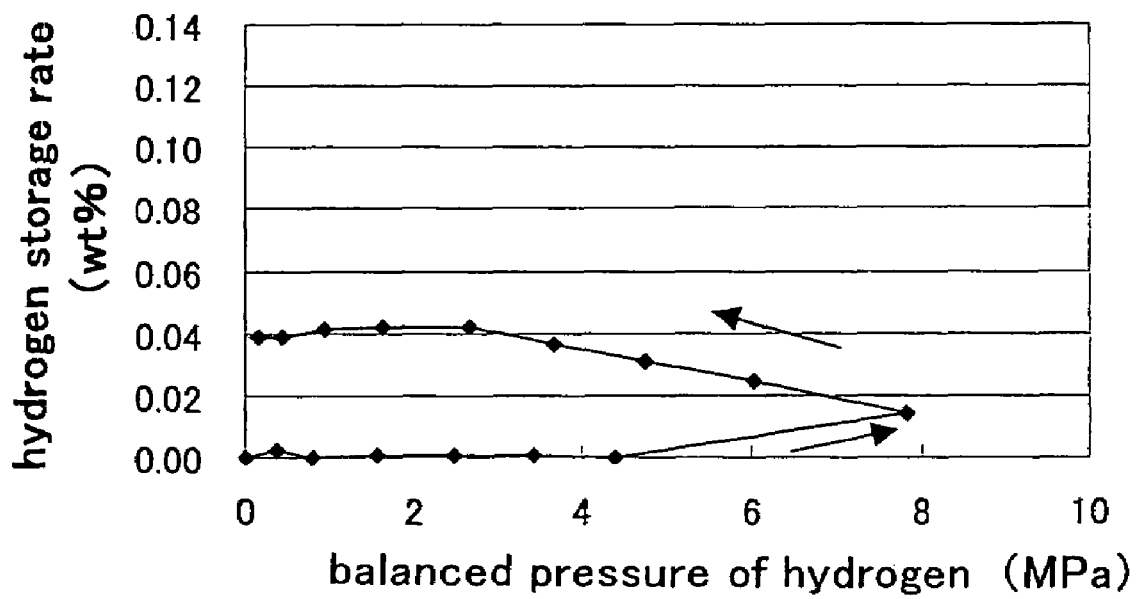
FIG. 5 is a graph showing the evaluation result of hydrogen storage performance of TMPE in Example 5.

From the results shown in Table 5 and FIG. 5, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid TMPE so as to form hydrogen clathrate.

We confirmed that stored hydrogen can be emitted under condition of 50° C. and the ambient pressure or under condition of a reduced pressure (0.005 MPa).

EXAMPLE 6

0.615 g of 1,1,2,2-tetraphenylethane (hereinafter, referred to as "TPE") in solid power state was evaluated according to the aforementioned test method under such a condition that the retention time at each pressure was 1 hour. The relation between the balanced pressure and the hydrogen storage rate was shown in Table 6 and FIG. 6.

TABLE 6

Evaluation Results of Hydrogen Storage Capacity of TPE
(25° C.; Retention time at each pressure: 1 hour)

| Balanced Pressure (MPa) | Hydrogen Storage Rate (wt %) |
|---|---|
| 0.00001 | 0 |
| 0.29124 | 2.08E−03 |
| 0.7583 | 3.31E−03 |
| 1.55817 | 9.53E−03 |
| 2.49921 | 1.79E−02 |
| 3.47931 | 3.37E−02 |

TABLE 6-continued

Evaluation Results of Hydrogen Storage Capacity of TPE
(25° C.; Retention time at each pressure: 1 hour)

| Balanced Pressure (MPa) | Hydrogen Storage Rate (wt %) |
|---|---|
| 4.45467 | 4.56E−02 |
| 7.85865 | 7.99E−02 |
| 6.09663 | 7.89E−02 |
| 4.80934 | 7.35E−02 |
| 3.67186 | 7.14E−02 |
| 2.64523 | 6.48E−02 |
| 1.63782 | 5.95E−02 |
| 0.95366 | 5.56E−02 |
| 0.41393 | 4.98E−02 |
| 0.15164 | 4.87E−02 |

Figure 6:
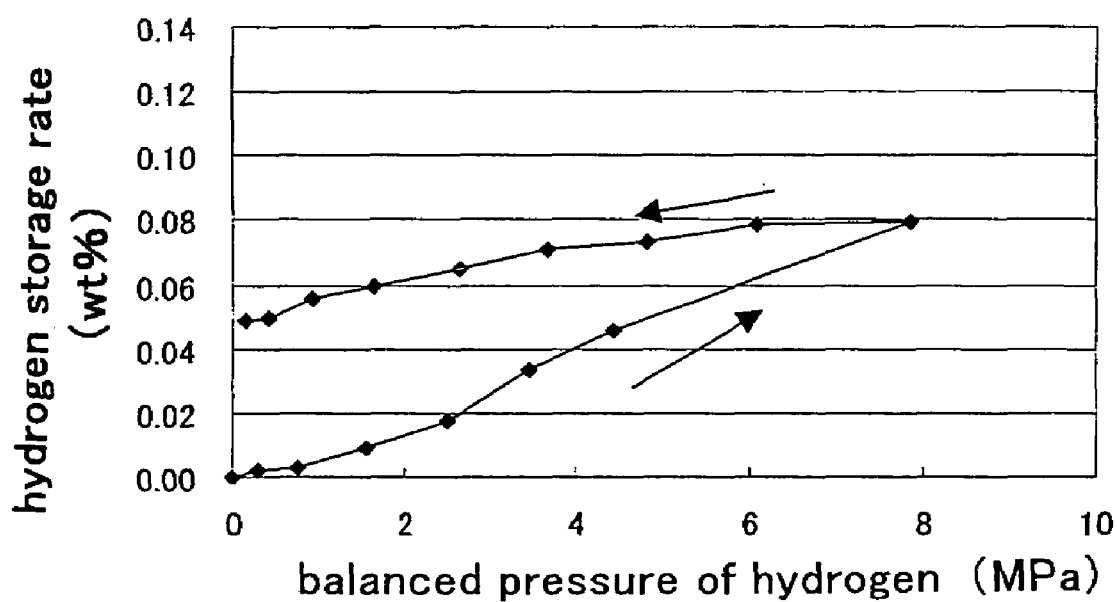
FIG. 6 is a graph showing the evaluation result of hydrogen storage performance of TPE in Example 6.

From the results shown in Table 6 and FIG. 6, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid TPE so as to form hydrogen clathrate.

We confirmed that stored hydrogen can be emitted under condition of 50° C. and the ambient pressure or under condition of a reduced pressure (0.005 MPa).

EXAMPLE 7

0.547 g of bis-dicyclohexylamide diphenirate (hereinafter, referred to as "DBDCA") in solid poker state was evaluated according to the aforementioned test method under such a condition that the retention time at each pressure was 1 hour. The relation between the balanced pressure and the hydrogen storage rate was shown in Table 7 and FIG. 7.

TABLE 7

Evaluation Results of Hydrogen Storage Capacity of DBDCA
(25° C.; Retention time at each pressure: 1 hour)

| Balanced Pressure (MPa) | Hydrogen Storage Rate (wt %) |
|---|---|
| 0.00001 | 0 |
| 0.26798 | 2.60E−03 |
| 0.61094 | 5.37E−03 |
| 1.5056 | 1.02E−02 |
| 2.50882 | 1.88E−02 |
| 3.46749 | 3.28E−02 |
| 4.50091 | 4.32E−02 |
| 7.98069 | 7.74E−02 |
| 6.12568 | 8.49E−02 |
| 4.82424 | 8.90E−02 |
| 3.71524 | 8.71E−02 |
| 2.68839 | 8.50E−02 |
| 1.67032 | 7.75E−02 |
| 0.88976 | 7.14E−02 |
| 0.39007 | 6.94E−02 |

Figure 7:
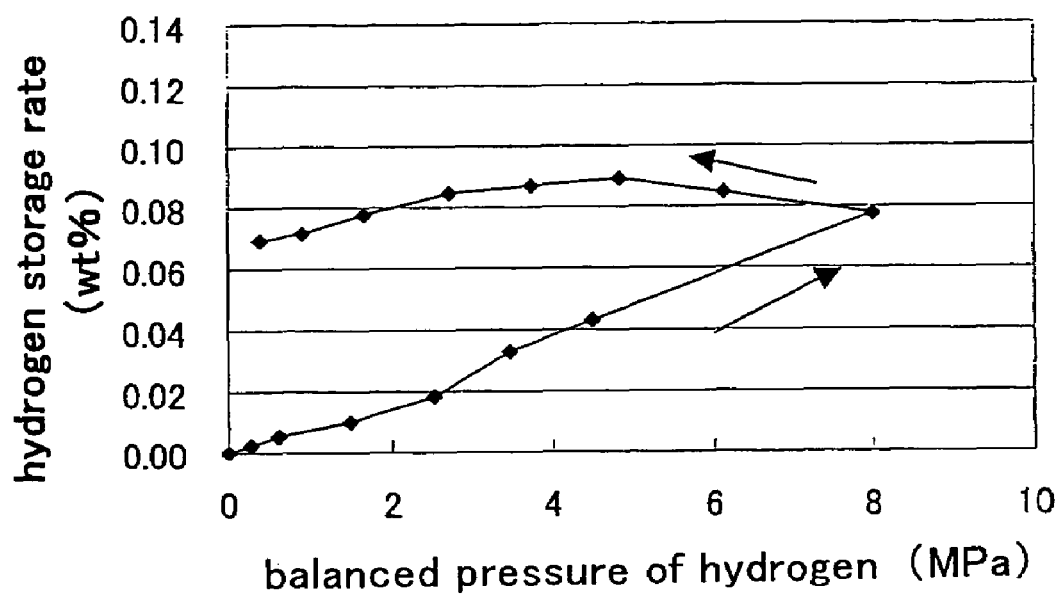
FIG. 7 is a graph showing the evaluation result of hydrogen storage performance of DBDCA in Example 7.

From the results shown in Table 7 and FIG. 7, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid DBDCA so as to form hydrogen clathrate.

We confirmed that stored hydrogen can be emitted under condition of 50° C. and the ambient pressure or under condition of a reduced pressure (0.005 MPa).

EXAMPLE 8

0.6442 g of bis-dicyclohexylamide fumarate (hereinafter, referred to as "FBDCA") in solid power state was evaluated according to the aforementioned test method under such a condition that the retention time at each pressure was 1 hour. The relation between the balanced pressure and the hydrogen storage rate was shown in Table 8 and FIG. 8.

TABLE 8

Evaluation Results of Hydrogen Storage Capacity of FBDCA
(25° C.; Retention time at each pressure: 1 hour)

| Balanced Pressure (MPa) | Hydrogen Storage Rate (wt %) |
|---|---|
| 0.00001 | 0 |
| 0.27639 | 0.00E+00 |
| 0.76462 | 0.00E+00 |
| 1.58534 | 0.00E+00 |
| 2.5095 | 3.33E−04 |
| 3.49362 | 5.11E−03 |
| 4.50578 | 8.88E−03 |
| 7.91723 | 2.13E−02 |
| 6.11502 | 3.74E−02 |
| 4.80353 | 5.04E−02 |
| 3.69892 | 5.68E−02 |
| 2.66783 | 6.15E−02 |
| 1.66457 | 6.39E−02 |
| 0.86552 | 6.55E−02 |
| 0.38038 | 6.58E−02 |
| 0.20061 | 6.71E−02 |
| 0.13619 | 6.58E−02 |

Figure 8:
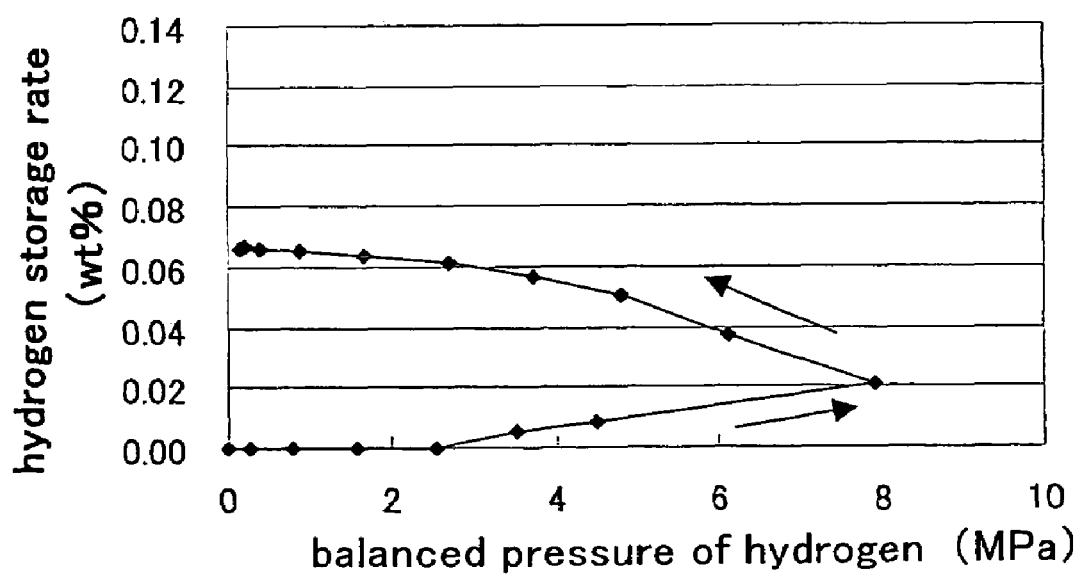
FIG. 8 is a graph showing the evaluation result of hydrogen storage performance of FBDCA in Example 8.

From the results shown in Table 8 and FIG. 8, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid FBDCA so as to form hydrogen clathrate.

We confirmed that stored hydrogen can be emitted under condition of 50° C. and the ambient pressure or under condition of a reduced pressure (0.005 MPa).

EXAMPLE 9

0.6456 g of $\alpha,\alpha,\alpha',\alpha'$-tetraphenyl-1,1'-biphenyl-2,2'-dimethanol (hereinafter, referred to as "TPBDM") in solid power state was evaluated according to the aforementioned test method under such a condition that the retention time at each pressure was 1 hour. The relation between the balanced pressure and the hydrogen storage rate was shown in Table 9 and FIG. 9.

TABLE 9

Evaluation Results of Hydrogen Storage Capacity of TPBDM
(25° C.; Retention time at each pressure: 1 hour)

| Balanced Pressure (MPa) | Hydrogen Storage Rate (wt %) |
|---|---|
| 0.00001 | 0 |
| 0.27325 | 3.86E−03 |
| 0.76318 | 5.86E−03 |

TABLE 9-continued

Evaluation Results of Hydrogen Storage Capacity of TPBDM
(25° C.; Retention time at each pressure: 1 hour)

| Balanced Pressure (MPa) | Hydrogen Storage Rate (wt %) |
| --- | --- |
| 1.57435 | 7.25E−03 |
| 2.52014 | 9.34E−03 |
| 3.51926 | 1.45E−02 |
| 4.48755 | 1.76E−02 |
| 7.94765 | 3.55E−02 |
| 6.14546 | 4.55E−02 |
| 4.82544 | 5.52E−02 |
| 3.72633 | 5.88E−02 |
| 2.68608 | 6.06E−02 |
| 1.66871 | 5.98E−02 |
| 1.3472 | 6.10E−02 |
| 0.56019 | 5.90E−02 |
| 0.26901 | 5.95E−02 |
| 0.16055 | 5.96E−02 |

Figure 9:
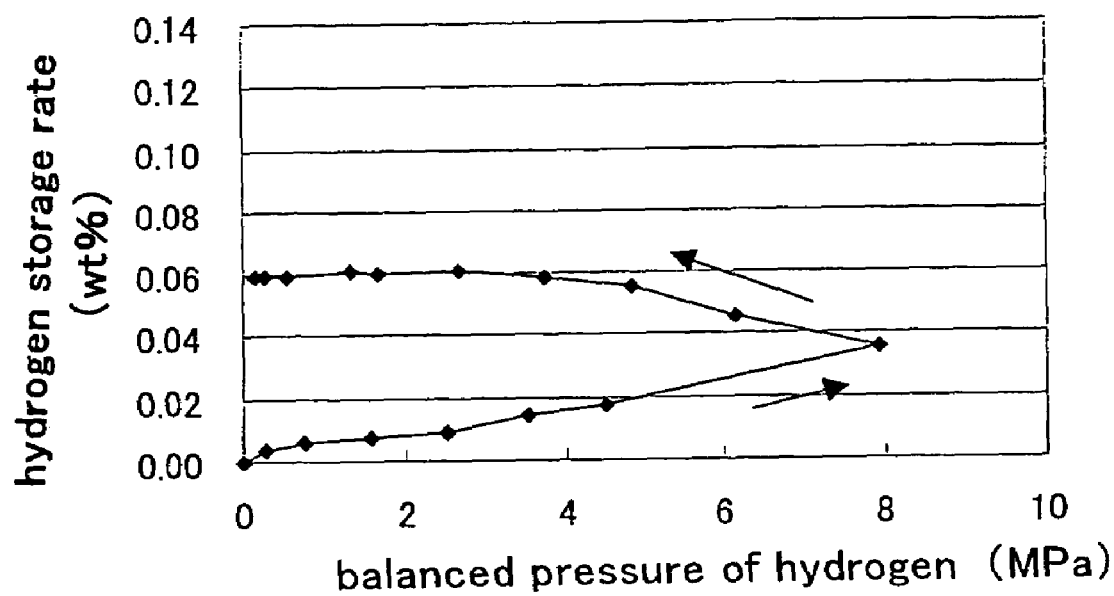
FIG. 9 is a graph showing the evaluation result of hydrogen storage performance of TPBDM in Example 9.

From the results shown in Table 9 and FIG. 9, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid TPBDM so as to form hydrogen clathrate.

We confirmed that stored hydrogen can be emitted under condition of 50° C. and the ambient pressure or under condition of a reduced pressure (0.005 MPa).

EXAMPLE 10

0.631 g of 1,1,6,6-tetraphenyl-2,4-hexadiyn-1,6-diol (hereinafter, referred to as "TPHDD") in solid power state was evaluated according to the aforementioned test method under such a condition that the retention time at each pressure was 1 hour. The relation between the balanced pressure and the hydrogen storage rate was shown in Table 10 and FIG. 10.

TABLE 10

Evaluation Results of Hydrogen Storage Capacity of TPHDD
(25° C.; Retention time at each pressure: 1 hour)

| Balanced Pressure (MPa) | Hydrogen Storage Rate (wt %) |
| --- | --- |
| 0.00001 | 0 |
| 0.2846 | 3.86E−03 |
| 0.76446 | 1.15E−03 |
| 1.56681 | 4.67E−03 |
| 2.49036 | 7.66E−03 |
| 3.44995 | 1.87E−02 |
| 4.48085 | 2.89E−02 |
| 7.92517 | 4.98E−02 |
| 6.15209 | 5.87E−02 |
| 4.85724 | 6.50E−02 |
| 3.73289 | 7.12E−02 |
| 2.73198 | 7.30E−02 |
| 1.68694 | 7.43E−02 |
| 0.90154 | 7.20E−02 |
| 0.39853 | 7.04E−02 |
| 0.21299 | 6.90E−02 |
| 0.14233 | 6.85E−02 |
| 0.05198 | 6.90E−02 |

Figure 10:
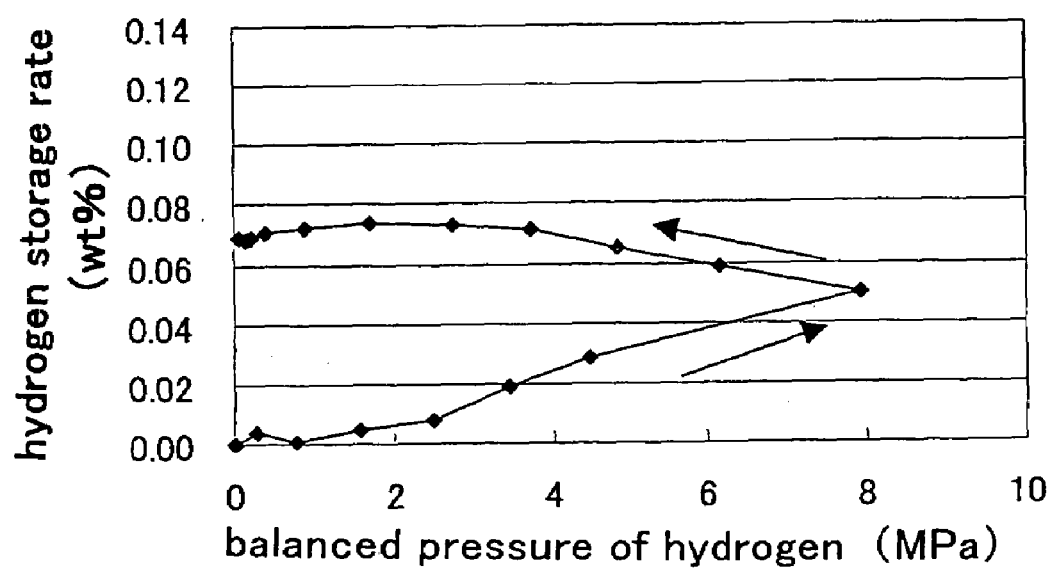
FIG. 10 is a graph showing the evaluation result of hydrogen storage performance of TPHDD in Example 10.

From the results shown in Table 10 and FIG. 10, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid TPHDD so as to form hydrogen clathrate.

We confirmed that stored hydrogen can be emitted under condition of 50° C. and the ambient pressure or under condition of a reduced pressure (0.005 MPa).

EXAMPLE 11

0.2256 g of 2-(m-cyanophenyl)phenanthro[9,10-d]imidazole (hereinafter, referred to as "CPPZZ") in solid power state was evaluated according to the aforementioned test method under such a condition that the retention time at each pressure was 1 hour. The relation between the balanced pressure and the hydrogen storage rate was shown in Table 11 and FIG. 11.

TABLE 11

Evaluation Results of Hydrogen Storage Capacity of CPPIZ
(25° C.; Retention time at each pressure: 1 hour)

| Balanced Pressure (MPa) | Hydrogen Storage Rate (wt %) |
| --- | --- |
| 0.00001 | 0 |
| 0.27501 | 3.67E−03 |
| 0.74744 | 6.10E−03 |
| 1.55025 | 1.05E−02 |
| 2.48037 | 1.42E−02 |
| 3.42067 | 1.95E−02 |
| 4.42905 | 3.54E−02 |
| 7.823 | 4.91E−02 |
| 6.09215 | 8.70E−02 |
| 4.83169 | 9.98E−02 |
| 3.70401 | 1.14E−01 |
| 2.66689 | 1.16E−01 |
| 1.67919 | 1.14E−01 |
| 0.92012 | 1.08E−01 |
| 0.41564 | 9.85E−02 |
| 0.22111 | 1.01E−01 |
| 0.41659 | 1.01E−01 |
| 0.05505 | 9.86E−02 |

Figure 11:
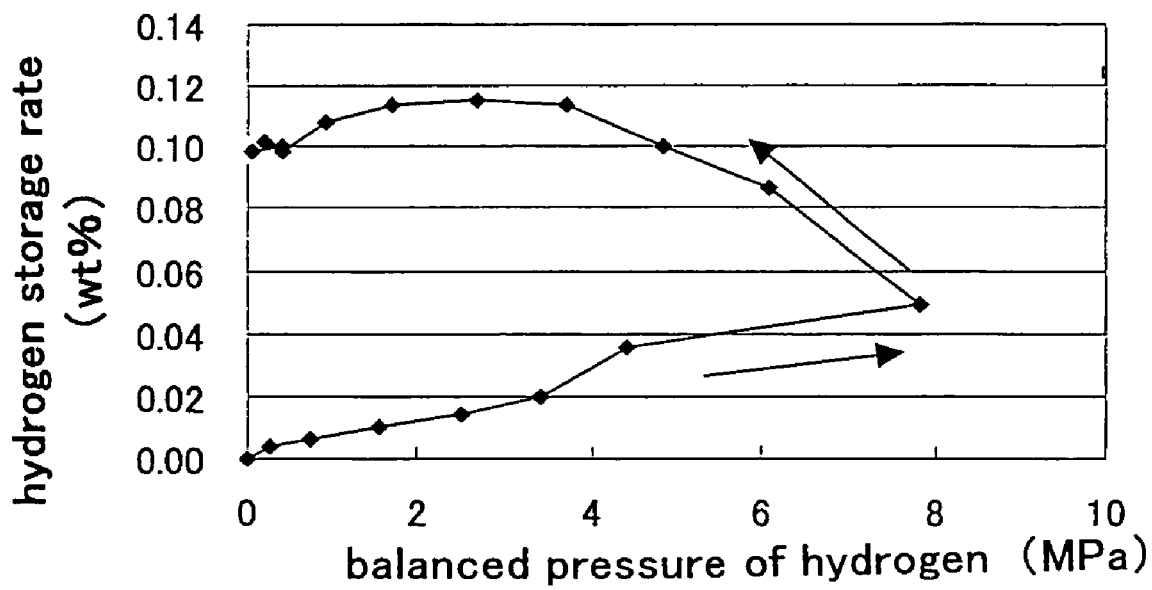
FIG. 11 is a graph showing the evaluation result of hydrogen storage performance of CPPIZ in Example 11.

From the results shown in Table 11 and FIG. 11, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid CPPIZ so as to form hydrogen clathrate.

We confirmed that stored hydrogen can be emitted under condition of 50° C. and the ambient pressure or under condition of a reduced pressure (0.005 MPa).

EXAMPLE 12

0.5188 g of 1,1,2,2-tetrakis(4-hydroxyphenyl)ethane (hereinafter, referred to as "THPEA") in solid power state was evaluated according to the aforementioned test method under such a condition that the retention time at each pressure was 1 hour. The relation between the balanced pressure and the hydrogen storage rate was shown in Table 12 and FIG. 12.

TABLE 12

Evaluation Results of Hydrogen Storage Capacity of THPEA
(25° C.; Retention time at each pressure: 1 hour)

| Balanced Pressure (MPa) | Hydrogen Storage Rate (wt %) |
|---|---|
| 0.00001 | 0 |
| 0.29865 | 3.93E−03 |
| 0.68963 | 4.98E−03 |
| 1.38148 | 3.34E−03 |
| 2.16169 | 9.01E−04 |
| 3.59962 | 2.72E−03 |
| 4.8627 | 7.64E−03 |
| 8.21891 | 2.68E−02 |
| 6.4096 | 4.14E−02 |
| 5.14432 | 3.18E−02 |
| 3.55335 | 3.10E−02 |
| 2.44797 | 2.82E−02 |
| 1.50235 | 2.45E−02 |
| 0.85956 | 2.20E−02 |
| 0.38532 | 2.11E−02 |
| 0.14243 | 1.81E−02 |

Figure 12:
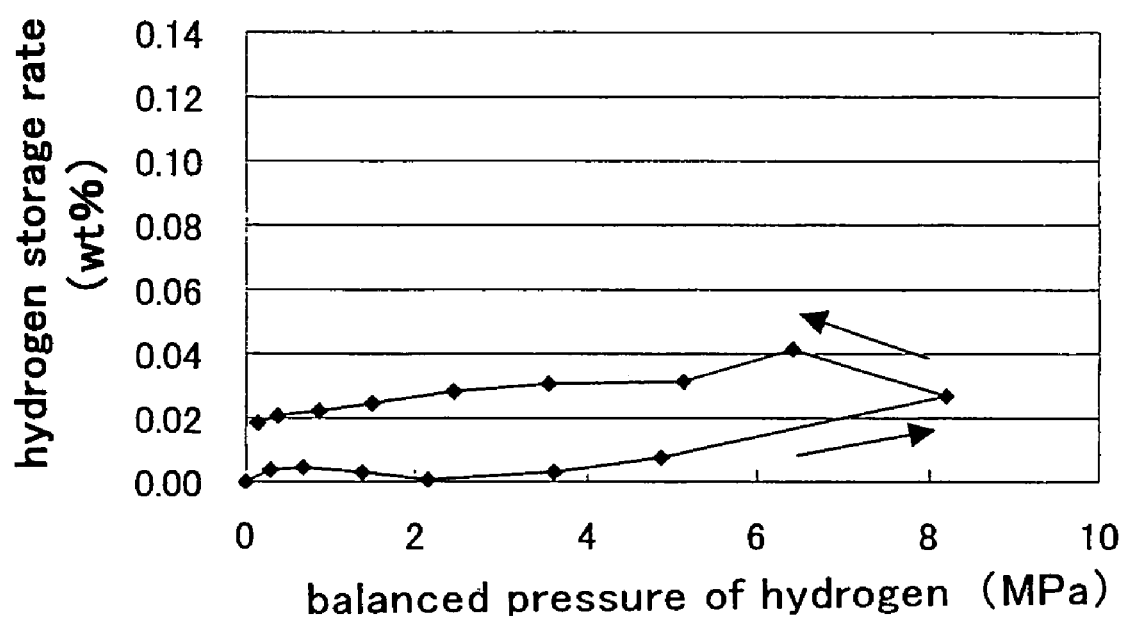
FIG. 12 is a graph showing the evaluation result of hydrogen storage performance of THPEA in Example 12.

From the results shown in Table 12 and FIG. 12, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid THPEA so as to form hydrogen clathrate.

We confirmed that stored hydrogen can be emitted under condition of 50° C. and the ambient pressure or under condition of a reduced pressure (0.005 MPa).

EXAMPLE 13

0.7029 g of hydroquinone (hereinafter, referred to as "HQ") in solid power state was evaluated according to the aforementioned test method under such a condition that the retention time at each pressure was 1 hour. The relation between the balanced pressure and the hydrogen storage rate was shown in Table 13 and FIG. 13.

TABLE 13

Evaluation Results of Hydrogen Storage Capacity of HQ
(25° C.; Retention time at each pressure: 1 hour)

| Balanced Pressure (MPa) | Hydrogen Storage Rate (wt %) |
|---|---|
| 0.00001 | 0 |
| 0.34576 | 5.92E−03 |
| 0.77692 | 1.02E−02 |
| 1.55369 | 1.99E−02 |
| 2.48608 | 2.69E−02 |
| 3.47638 | 3.21E−02 |
| 4.44271 | 3.94E−02 |
| 7.84616 | 8.34E−02 |
| 6.07125 | 7.89E−02 |
| 4.79427 | 7.32E−02 |
| 3.69405 | 6.47E−02 |
| 2.65721 | 5.42E−02 |
| 1.64583 | 4.88E−02 |
| 0.78016 | 3.64E−02 |
| 0.38000 | 3.05E−02 |
| 0.13936 | 2.76E−02 |

Figure 13:
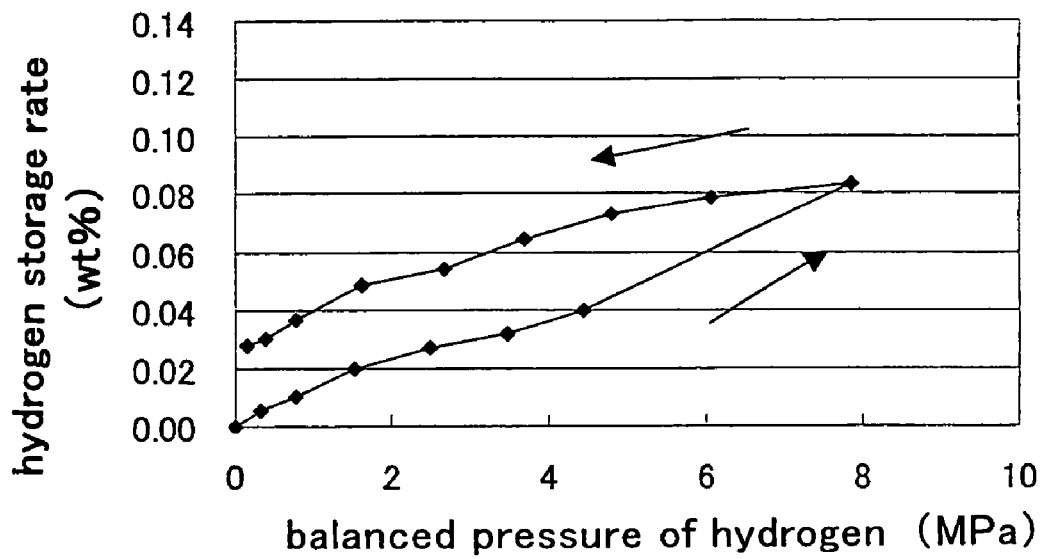
FIG. 13 is a graph showing the evaluation result of hydrogen storage performance of HQ in Example 13.

From the results shown in Table 13 and FIG. 13, it was found that the hydrogen storage rate was increased as the hydrogen pressure was increased.

We confirmed that stored hydrogen can be emitted under condition of 50° C. and the ambient pressure or under condition of a reduced pressure (0.005 MPa).

EXAMPLE 14

0.3482 g of urea in solid power state was evaluated according to the aforementioned test method under such a condition that the retention time at each pressure was 1 hour. The relation between the balanced pressure and the hydrogen storage rate was shown in Table 14 and FIG. 14.

TABLE 14

Evaluation Results of Hydrogen Storage Capacity of urea
(25° C.; Retention time at each pressure: 1 hour)

| Balanced Pressure (MPa) | Hydrogen Storage Rate (wt %) |
|---|---|
| 0.00001 | 0 |
| 0.26619 | 1.09E−03 |
| 0.79056 | 1.22E−03 |
| 1.584 | 3.11E−03 |
| 2.51682 | 2.82E−03 |
| 3.49309 | 1.78E−04 |
| 4.46605 | 1.51E−02 |
| 7.91202 | 3.92E−02 |
| 6.08862 | 5.12E−02 |
| 4.81388 | 5.47E−02 |
| 3.70222 | 5.38E−02 |
| 2.64015 | 4.92E−02 |
| 1.62255 | 3.83E−02 |
| 0.96213 | 3.32E−02 |
| 0.40202 | 3.16E−02 |
| 0.1442 | 2.95E−02 |

Figure 14:
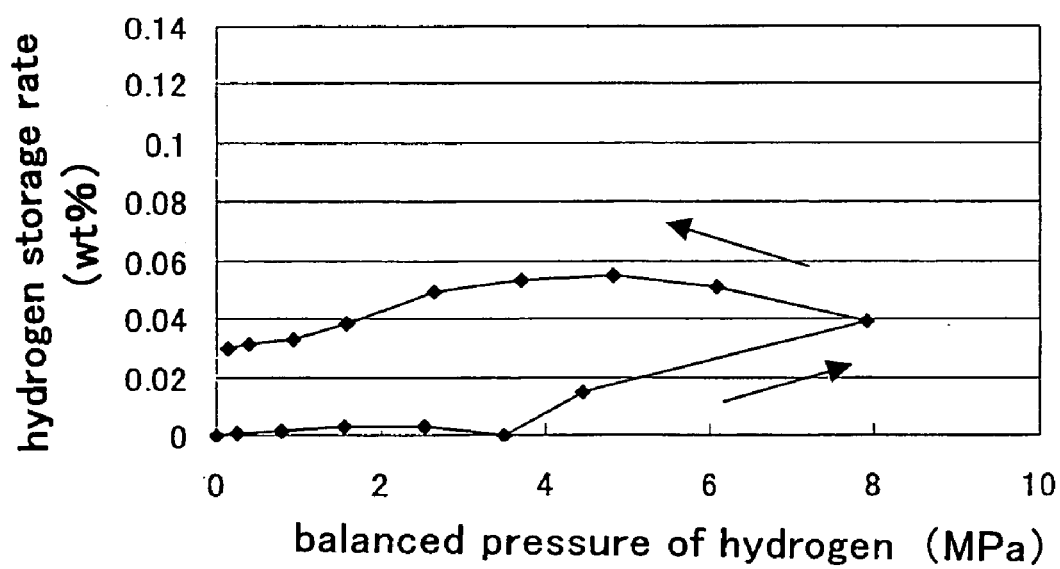
FIG. 14 is a graph showing the evaluation result of hydrogen storage performance of urea in Example 14.

From the results shown in Table 14 and FIG. 14, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid urea so as to form hydrogen clathrate.

We confirmed that stored hydrogen can be emitted under condition of 50° C. and the ambient pressure or under condition of a reduced pressure (0.005 MPa).

EXAMPLE 15

0.888 g of acetylene dicarboxyl acid (hereinafter, referred to as "AC") in solid power state was evaluated according to the aforementioned test method under such a condition that the retention time at each pressure was 1 hour. The relation between the balanced pressure and the hydrogen storage rate was shown in Table 15 and FIG. 15.

TABLE 15

Evaluation Results of Hydrogen Storage Capacity of AC
(25° C.; Retention time at each pressure: 1 hour)

| Balanced Pressure (MPa) | Hydrogen Storage Rate (wt %) |
|---|---|
| 0.00001 | 0 |
| 0.27146 | 3.40E−03 |
| 0.74369 | 6.02E−03 |
| 1.5659 | 1.02E−02 |
| 2.50809 | 1.30E−02 |
| 3.47403 | 1.81E−02 |
| 4.45074 | 1.42E−02 |

TABLE 15-continued

Evaluation Results of Hydrogen Storage Capacity of AC
(25° C.; Retention time at each pressure: 1 hour)

| Balanced Pressure (MPa) | Hydrogen Storage Rate (wt %) |
|---|---|
| 7.88744 | 2.29E−02 |
| 6.11056 | 2.47E−02 |
| 4.78659 | 2.57E−02 |
| 3.69364 | 2.48E−02 |
| 2.65705 | 2.40E−02 |
| 1.63543 | 2.09E−02 |
| 0.86718 | 1.83E−02 |
| 0.37335 | 1.68E−02 |
| 0.1354 | 1.68E−02 |

Figure 15:
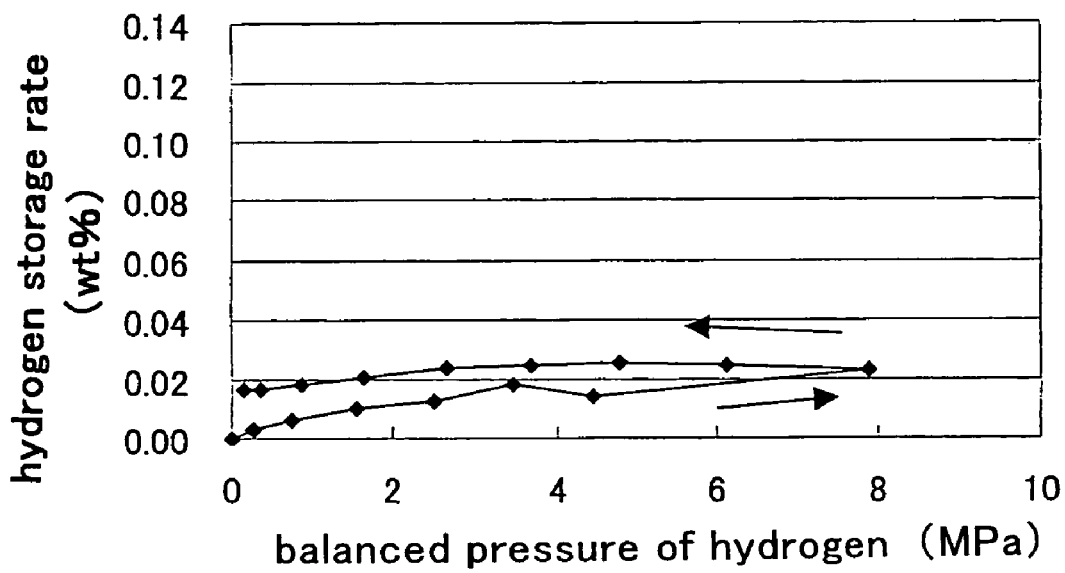
FIG. 15 is a graph showing the evaluation result of hydrogen storage performance of AC in Example 15.

From the results shown in Table 15 and FIG. 15, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid AC so as to form hydrogen clathrate.

We confirmed that stored hydrogen can be emitted under condition of 50° C. and the ambient pressure or under condition of a reduced pressure (0.005 MPa).

EXAMPLE 16

0.8967 g of β-cyclodextrin (hereinafter, referred to as "CD") in solid power state was evaluated according to the aforementioned test method under such a condition that the retention time at each pressure was 1 hour. The relation between the balanced pressure and the hydrogen storage rate was shown in Table 16 and FIG. 16.

TABLE 16

Evaluation Results of Hydrogen Storage Capacity of CD
(25° C.; Retention time at each pressure: 1 hour)

| Balanced Pressure (Mpa) | Hydrogen Storage Rate (wt %) |
|---|---|
| 0.00001 | 0 |
| 0.29994 | 2.20E−03 |
| 0.63 | 1.30E−03 |
| 1.59541 | 2.29E−04 |
| 2.61668 | 5.74E−03 |
| 3.47134 | 1.37E−02 |
| 4.44424 | 2.14E−02 |
| 7.87665 | 5.17E−02 |
| 6.17737 | 4.61E−02 |
| 4.90025 | 3.92E−02 |
| 3.72096 | 3.15E−02 |
| 2.7198 | 2.45E−02 |
| 1.5438 | 1.53E−02 |
| 0.85297 | 9.75E−03 |
| 0.37524 | 5.25E−03 |
| 0.13649 | 2.22E−03 |

Figure 16:
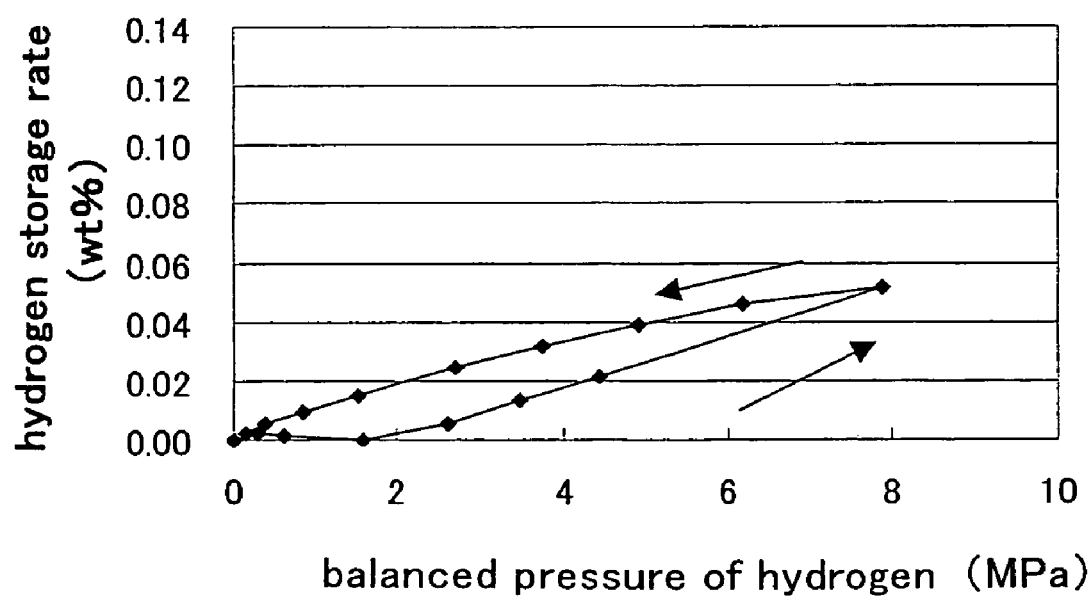
FIG. 16 is a graph showing the evaluation result of hydrogen storage performance of CD in Example 16.

From the results shown in Table 16 and FIG. 16, it was found that the hydrogen storage rate was increased as the hydrogen pressure was increased.

EXAMPLE 17

0.7383 g of methyl gallate (hereinafter, referred to as "GAM") in solid power state was evaluated according to the aforementioned test method under such a condition that the retention time at each pressure was 1 hour. The relation between the balanced pressure and the hydrogen storage rate was shown in Table 17 and FIG. 17.

TABLE 17

Evaluation Results of Hydrogen Storage Capacity of GAM
(25° C.; Retention time at each pressure: 1 hour)

| Balanced Pressure (MPa) | Hydrogen Storage Rate (wt %) |
|---|---|
| 0.00001 | 0 |
| 0.29993 | 2.27E−03 |
| 0.70041 | 2.40E−03 |
| 1.9847 | 2.90E−03 |
| 2.7857 | 7.70E−03 |
| 3.53863 | 9.03E−03 |
| 4.6868 | 1.21E−02 |
| 7.98167 | 3.17E−02 |
| 6.36749 | 3.31E−02 |
| 5.03659 | 3.48E−02 |
| 3.9262 | 3.26E−02 |
| 2.59506 | 2.61E−02 |
| 1.54629 | 2.32E−02 |
| 0.86813 | 2.07E−02 |
| 0.38689 | 1.90E−02 |
| 0.14084 | 1.96E−02 |

Figure 17:
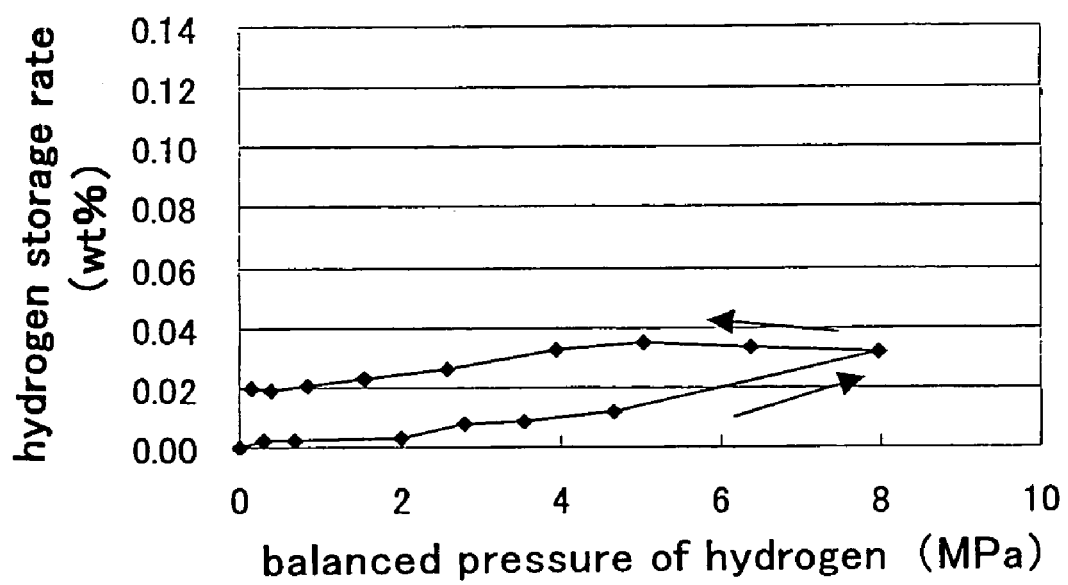
FIG. 17 is a graph showing the evaluation result of hydrogen storage performance of GAM in Example 17.

From the results shown in Table 17 and FIG. 17, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid GAM so as to form hydrogen clathrate.

We confirmed that stored hydrogen can be emitted under condition of 50° C. and the ambient pressure or under condition of a reduced pressure (0.005 MPa).

EXAMPLE 18

0.7411 g of deocycholic acid (hereinafter, referred to as "DCA") in solid power state was evaluated according to the aforementioned test method under such a condition that the retention time at each pressure was 1 hour. The relation between the balanced pressure and the hydrogen storage rate was shown in Table 18 and FIG. 18.

TABLE 18

Evaluation Results of Hydrogen Storage Capacity of DCA
(25° C.; Retention time at each pressure: 1 hour)

| Balanced Pressure (MPa) | Hydrogen Storage Rate (wt %) |
|---|---|
| 0.00001 | 0 |
| 0.30282 | 3.91E−03 |
| 0.69569 | 3.72E−03 |
| 1.41085 | 3.74E−03 |
| 2.54758 | 3.92E−03 |
| 3.62008 | 7.68E−03 |
| 4.63304 | 1.19E−02 |
| 7.96485 | 1.80E−02 |
| 6.2381 | 1.80E−02 |
| 4.98709 | 2.04E−02 |
| 3.89659 | 1.90E−02 |
| 2.56303 | 1.70E−02 |
| 1.52619 | 1.45E−02 |
| 0.85848 | 1.26E−02 |
| 0.38068 | 1.09E−02 |
| 0.13748 | 1.08E−02 |

Figure 18:
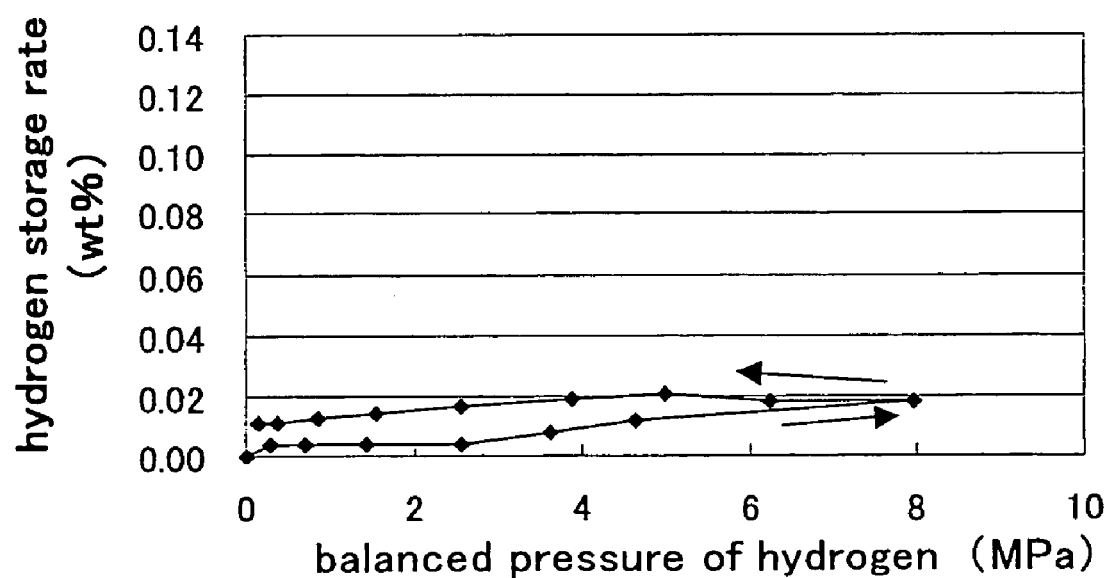
FIG. 18 is a graph showing the evaluation result of hydrogen storage performance of DCA in Example 18.

From the results shown in Table 18 and FIG. 18, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid DCA so as to form hydrogen clathrate.

We confirmed that stored hydrogen can be emitted under condition of 50° C. and the ambient pressure or under condition of a reduced pressure (0.005 MPa).

EXAMPLE 19

0.657 g of cellulose in solid power state was evaluated according to the aforementioned test method under such a condition that the retention time at each pressure was 1 hour. The relation between the balanced pressure and the hydrogen storage rate was shown in Table 19 and FIG. 19.

TABLE 19

Evaluation Results of Hydrogen Storage Capacity of cellulose
(25° C.; Retention time at each pressure: 1 hour)

| Balanced Pressure (MPa) | Hydrogen Storage Rate (wt %) |
|---|---|
| 0.00001 | 0 |
| 0.29382 | 3.44E−03 |
| 1.75806 | 6.91E−03 |
| 1.78015 | 8.20E−03 |
| 2.33393 | 9.45E−03 |
| 3.67005 | 1.60E−02 |
| 4.88507 | 1.69E−02 |
| 8.25992 | 2.46E−02 |
| 6.49236 | 2.78E−02 |
| 5.18519 | 3.48E−02 |
| 3.57395 | 3.27E−02 |
| 2.44579 | 2.89E−02 |
| 2.50406 | 3.13E−02 |
| 1.23267 | 2.62E−02 |
| 0.52372 | 2.29E−02 |
| 0.19309 | 2.11E−02 |

Figure 19:
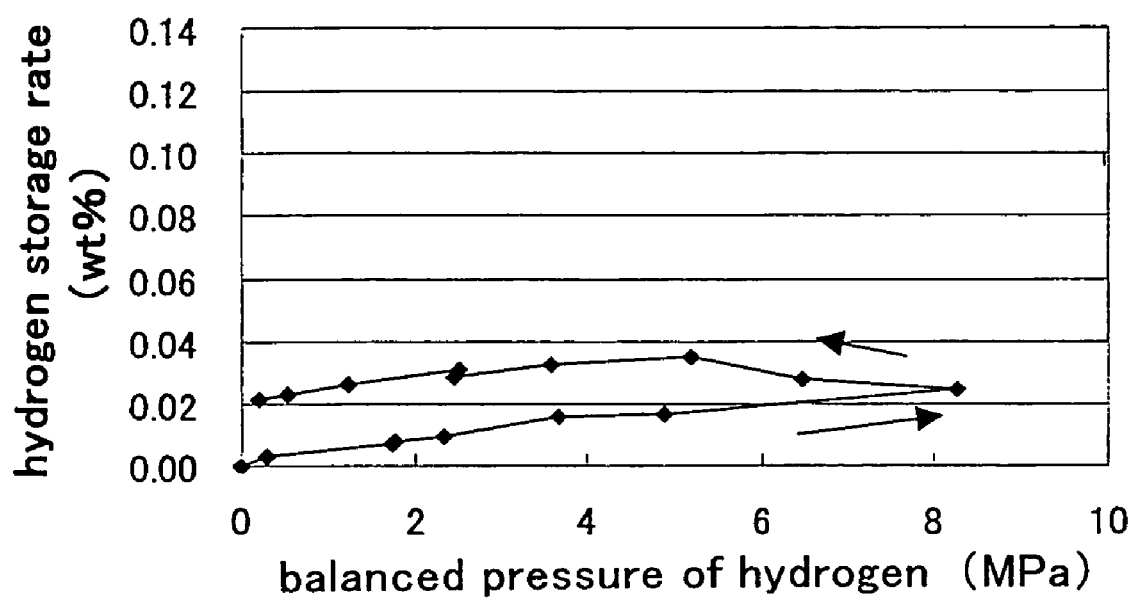
FIG. 19 is a graph showing the evaluation result of hydrogen storage performance of cellulose in Example 19.

From the results shown in Table 19 and FIG. 19, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid cellulose so as to form hydrogen clathrate.

We confirmed that stored hydrogen can be emitted under condition of 50° C. and the ambient pressure or under condition of a reduced pressure (0.005 MPa).

EXAMPLE 20

0.6725 g of chitosan in solid power state was evaluated according to the aforementioned test method under such a condition that the retention time at each pressure was 1 hour. The relation between the balanced pressure and the hydrogen storage rate was shown in Table 20 and FIG. 20.

TABLE 20

Evaluation Results of Hydrogen Storage Capacity of chitosan
(25° C.; Retention time at each pressure: 1 hour)

| Balanced Pressure (MPa) | Hydrogen Storage Rate (wt %) |
|---|---|
| 0.00001 | 0 |
| 0.30279 | 3.44E−03 |
| 0.69235 | 2.12E−03 |
| 2.15133 | 4.39E−03 |
| 2.97406 | 1.25E−02 |
| 3.91867 | 1.65E−02 |
| 4.9564 | 2.57E−02 |
| 8.17041 | 5.08E−02 |
| 6.17912 | 4.88E−02 |
| 4.99404 | 4.49E−02 |
| 3.54056 | 3.78E−02 |
| 2.45056 | 3.15E−02 |
| 1.49881 | 2.50E−02 |
| 0.85259 | 2.11E−02 |
| 0.38412 | 1.85E−02 |
| 0.14203 | 1.70E−02 |

Figure 20:
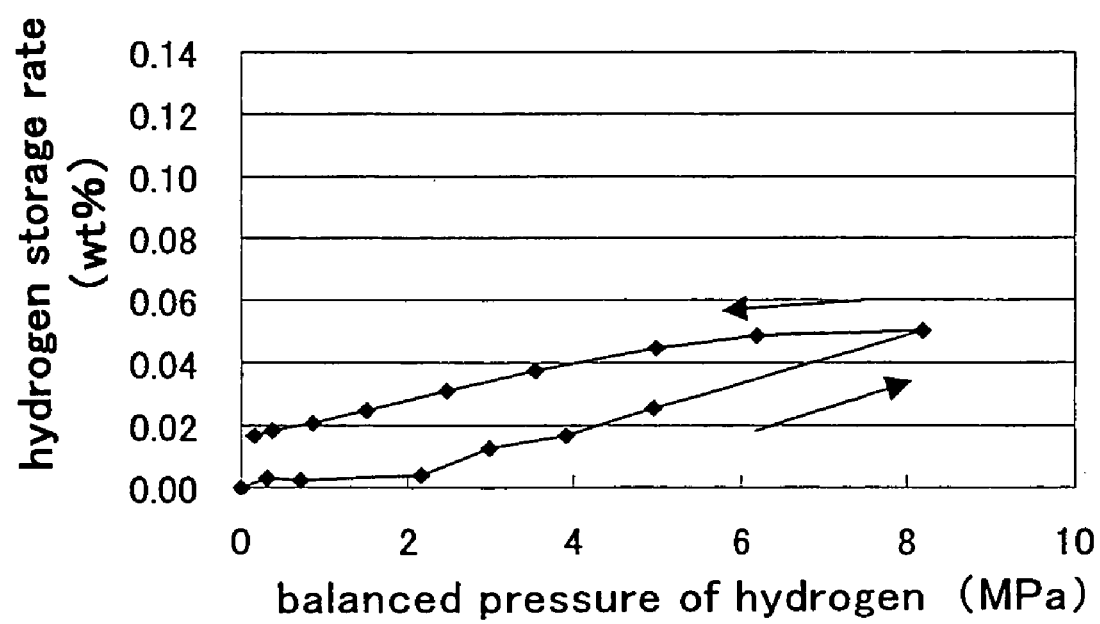
FIG. 20 is a graph showing the evaluation result of hydrogen storage performance of chitosan in Example 20.

From the results shown in Table 20 and FIG. 20, it was found that the hydrogen storage rate was increased as the hydrogen pressure was increased. Even when the pressure was reduced from near 8 MPa, the storage rate is not lowered. From this, it was found that the hydrogen storage is achieved not only by physical absorption. This is attributed to the fact that hydrogen molecules are enclosed into the solid chitosan so as to form hydrogen clathrate.

We confirmed that stored hydrogen can be emitted under condition of 50° C. and the ambient pressure or under condition of a reduced pressure (0.005 MPa).

EXAMPLE 21

0.5922 g of tri-m-tolylphosphine (hereinafter, referred to as "TTP") in solid power state was evaluated according to the aforementioned test method under such a condition that the retention time at each pressure was 1 hour. The relation between the balanced pressure and the hydrogen storage rate was shown in Table 21 and FIG. 21.

TABLE 21

Evaluation Results of Hydrogen Storage Capacity of TTP
(25° C.; Retention time at each pressure: 1 hour)

| Balanced Pressure (MPa) | Hydrogen Storage Rate (wt %) |
|---|---|
| 0.00001 | 0 |
| 0.30448 | 6.50E−03 |
| 0.70533 | 1.06E−02 |
| 1.72793 | 2.40E−02 |
| 2.74021 | 3.75E−02 |
| 3.552 | 4.73E−02 |
| 4.65216 | 6.82E−02 |
| 8.05616 | 1.25E−01 |
| 6.27169 | 1.15E−01 |
| 4.81187 | 9.71E−02 |
| 3.85328 | 8.07E−02 |
| 2.56244 | 5.96E−02 |
| 1.53375 | 4.23E−02 |
| 0.86878 | 3.32E−02 |
| 0.38471 | 2.73E−02 |
| 0.13945 | 2.45E−02 |

Figure 21:
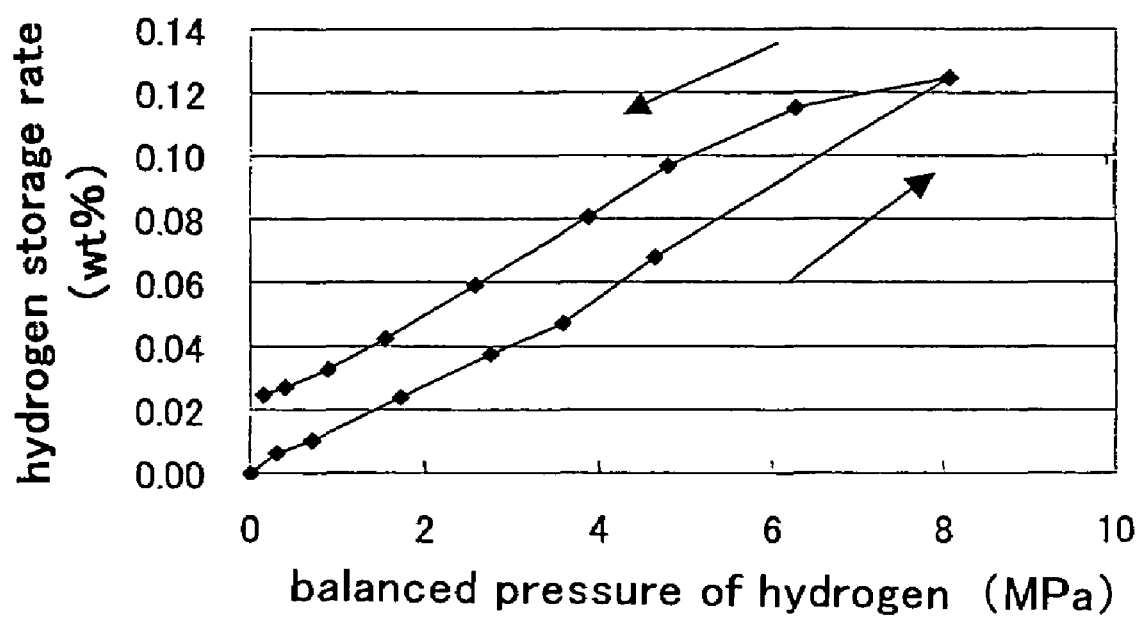
FIG. 21 is a graph showing the evaluation result of hydrogen storage performance of TTP in Example 21.

From the results shown in Table 21 and FIG. 21, it was found that the hydrogen storage rate was increased as the hydrogen pressure was increased. We confirmed that stored hydrogen can be emitted under condition of 50° C. and the ambient pressure or under condition of a reduced pressure (0.005 MPa)

As apparent from the aforementioned results, according to the method for storing hydrogen of the present invention, hydrogen can be stored at the ordinary temperature and the ambient pressure, thereby eliminating the necessity of a pressure tight vessel, a cryogenic vessel, and the like. Therefore, the storage and transport of hydrogen in relatively compact and light form is be achieved and, in addition, stored hydrogen can be easily emitted and used for various applications.

[Description of Hydrogen Clathrate and Production Method Thereof]

Now, a hydrogen clathrate and a production method thereof of the present invention will be described in detail.

In the hydrogen clathrate and the production method thereof of the present invention, there is no particular limitation on host compound so that the host compound for enclosing hydrogen is any of compounds capable of enclosing hydrogen. Known host compounds are organic compounds of monomolecular type, multimolecular type, high-molecular type, and the like as described with regard to the method of hydrogen storage of the present invention and inorganic host compounds. Examples of the inorganic host compounds include clay minerals, montmorillonites, and zeolites.

Among the above host compounds, host compounds of multimolecular type of which enclosure capacity is hardly influenced by the size of molecules of guest compound are preferable. Among host compounds of multimolecular type, phenol-based host compounds such as 1,1-bis(4-hydroxyphenyl)cyclohexane are advantageous in view of enclosure capacity and industrial ready availability.

As the method of producing a hydrogen clathrate by making hydrogen to be enclosed by such a host compound, there are the following methods:

1. Method of dissolving a host compound into a solvent and bringing hydrogen in contact with the dissolved host compound during the recrystallization;
2. Method of bringing hydrogen and a host compound directly in contact with each other (for example, as stated in the description about the method of hydrogen storage, a method of bringing hydrogen and a host compound in contact with each other in the pressurized state);
3. Method of directly reacting a host compound with hydrogen by pulverizing the host compound in hydrogen atmosphere; and the like. To insert hydrogen molecules into crystal lattice of the host compound, it is preferable to dissolve a host compound to a solvent, dispersing molecules of the host compound, and after that reacting the host compound with hydrogen as guest molecules during the recrystallization because such a method enables to effectively produce a hydrogen clathrate.

In this case, the solvent for dissolving the host compound may be any of solvents capable of dissolving the host compound and is suitably selected according to the kind of the host compound. For example, any of solvents including alcohols such as methanol and ethanol, ketones such as acetone and methyl ethyl ketone, esters such as ethyl acetate, ethers such as diethyl ether and dibutyl ether, furans such as etrahydrofuran, amides such as dimethyl acetamide, and aldehydes such as acetaldehyde and benzaldehyde can be employed as a solvent for a host compound of multimolecular type such as a phenol-based host compound as mentioned above. Among these, high volatile solvents are preferable. In addition, it is preferable to use a solvent which is not enclosed by the used host compound (because, if using a solvent which can be enclosed by the used host compound, hydrogen, taken off from the obtained hydrogen clathrate, may unfortunately contain the solvent). However, there is a case that three components, i.e. a host compound, hydrogen and solvent, cooperate together to form a stable clathrate, so the solvent is thus not limited the aforementioned condition.

There is no particular limitation on the concentration of the host compound in the solvent because the solubility depends on the kind of host compound and the kind of solvent.

To bring the host compound dissolved in solvent and hydrogen in contact with each other, hydrogen is injected into the solvent with bubbling. Therefore, the host compound in the solvent comes in contact with hydrogen to react with the hydrogen and the solvent is vaporized, thereby depositing crystals of hydrogen clathrate enclosing hydrogen molecules as guest molecules. This reaction can occur at the ordinary temperature and at the ambient pressure.

The hydrogen clathrate obtained in the aforementioned manner is a hydrogen clathrate normally having hydrogen molecules from 0.2 to 20 moles relative to 1 mole of the host compound, but somewhat depends on the kind of used host compound and the contact condition with hydrogen.

The hydrogen clathrate thus obtained can stably enclose hydrogen for a long period of time at the ordinary temperature and the ambient pressure. Moreover, the hydrogen clathrate is light as compared to hydrogen storage alloy and thus has excellent handling property. In addition, the hydrogen clathrate can be easily stored and transported in a container made of glass, metal, or plastic.

Further, the hydrogen can be taken off from the hydrogen clathrate by heating the hydrogen clathrate to a temperature in a range from 30° C. to 200° C., particularly in a range from 40° C. to 100° C. The temperature somewhat depends on the kind of host compound. Accordingly, hydrogen can be easily emitted from the hydrogen clathrate and collected.

Hydrogen clathrate produced by injecting hydrogen into a solvent containing dissolved host compound as mentioned above normally consists of two components of the host compound and the hydrogen. However, there is a case that the hydrogen clathrate includes used solvent in addition to host compound and hydrogen, that is, consist of three components of the host compound, the hydrogen, and the solvent. To prevent the solvent from being emitted together with the hydrogen while the hydrogen is taken off from the hydrogen clathrate consisting of the three components, it is preferable that the hydrogen clathrate has a difference of 20° C. through 30° C. between the emission temperature of solvent and the emission temperature of hydrogen. In this case, it is especially preferable that the used solvent having a boiling point higher than the emission temperature of the hydrogen.

The host compound after emitting hydrogen once enclosed therein can form a hydrogen clathrate enclosing hydrogen again by being in contact with hydrogen again. That is, the host compound is reusable repeatedly. Further, the host compound in solid state after emitting hydrogen once enclosed therein has improved selective enclosure capacity of hydrogen so that even when the host compound reacts with mixed gas containing hydrogen, the host compound selectively encloses hydrogen.

With such a host compound having improved selective enclosure capability of hydrogen, only hydrogen can be selectively collected from various process exhaust gas containing hydrogen, thereby making an effective use of collected hydrogen as energy resource.

The hydrogen clathrate and the production method thereof of the present invention will be described in detail with reference to Examples.

EXAMPLE 22

[Production of Hydrogen Clathrate]

0.2 g of 1,1-bis(4-hydroxyphenyl)cyclohexane (hereinafter, referred to as "BHC") and 3 ml of methanol were put in a sample bottle and mixed so that the BHC was dissolved. As hydrogen was bubbled from a commercially available gas cylinder into the solvent, the methanol as solvent evaporates, thereby obtaining crystals. These crystals were air-dried for 1 hour under room temperature to vaporize the methanol (Crystal A).

For comparison, a solvent obtained by dissolving 0. 2 g of BHC in 3 ml of methanol was left without reaction (with hydrogen). Crystals thus deposited were taken (Crystal B).

Figure 22:
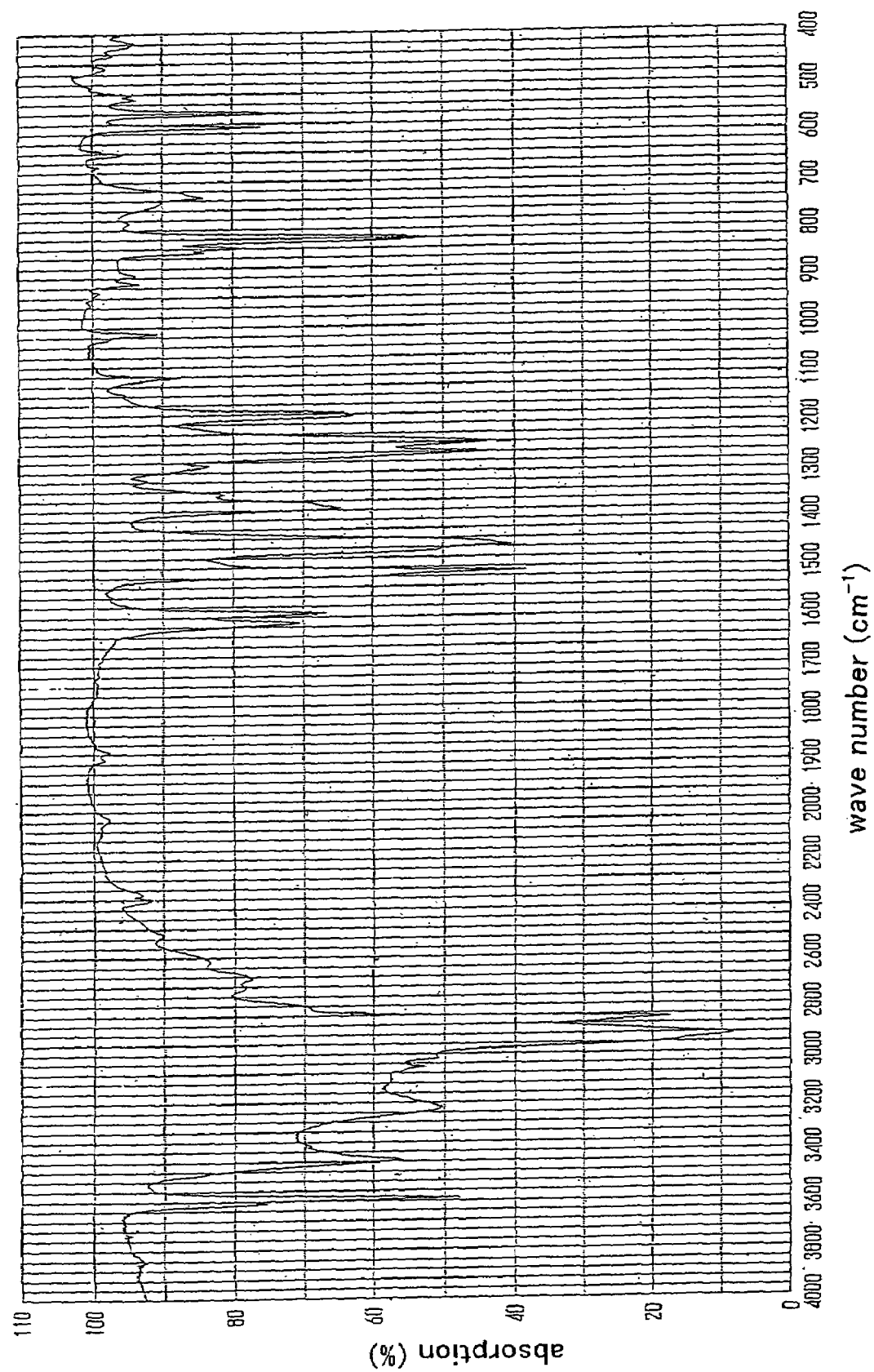
FIG. 22 is a graph showing IR spectrum of a hydrogen clathrate (Crystal A) produced in Example 22.

The IR spectrum measurements were made on Crystals A and B obtained above. The results of the measurements are shown in FIGS. 20 and 21, respectively, and the superposed data of these results is shown in FIG. 22. From FIGS. 20 through 23 showing IR spectrums, the IR spectrums of the crystal A and Crystal B are clearly different from each other in a range from 3100 to 3700 $cm^{-1}$ and around 1200 $cm^{-1}$ depending on the hydrogen group of BHC as the host compound. This makes sure that different crystals were obtained.

Figure 23:
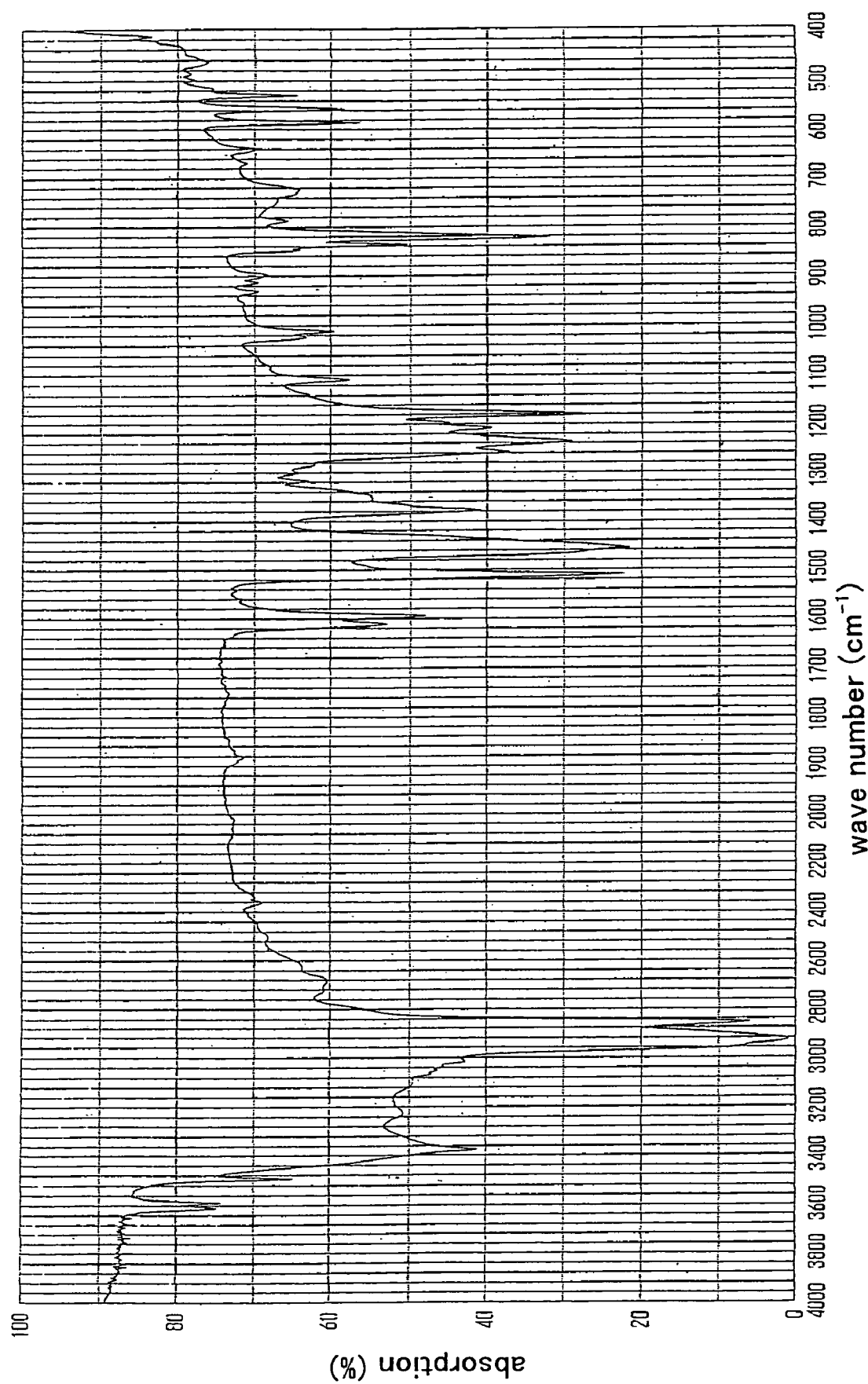
FIG. 23 is a graph showing IR spectrum of a methanol clathrate (Crystal B) produced in Example 22.
Figure 24:
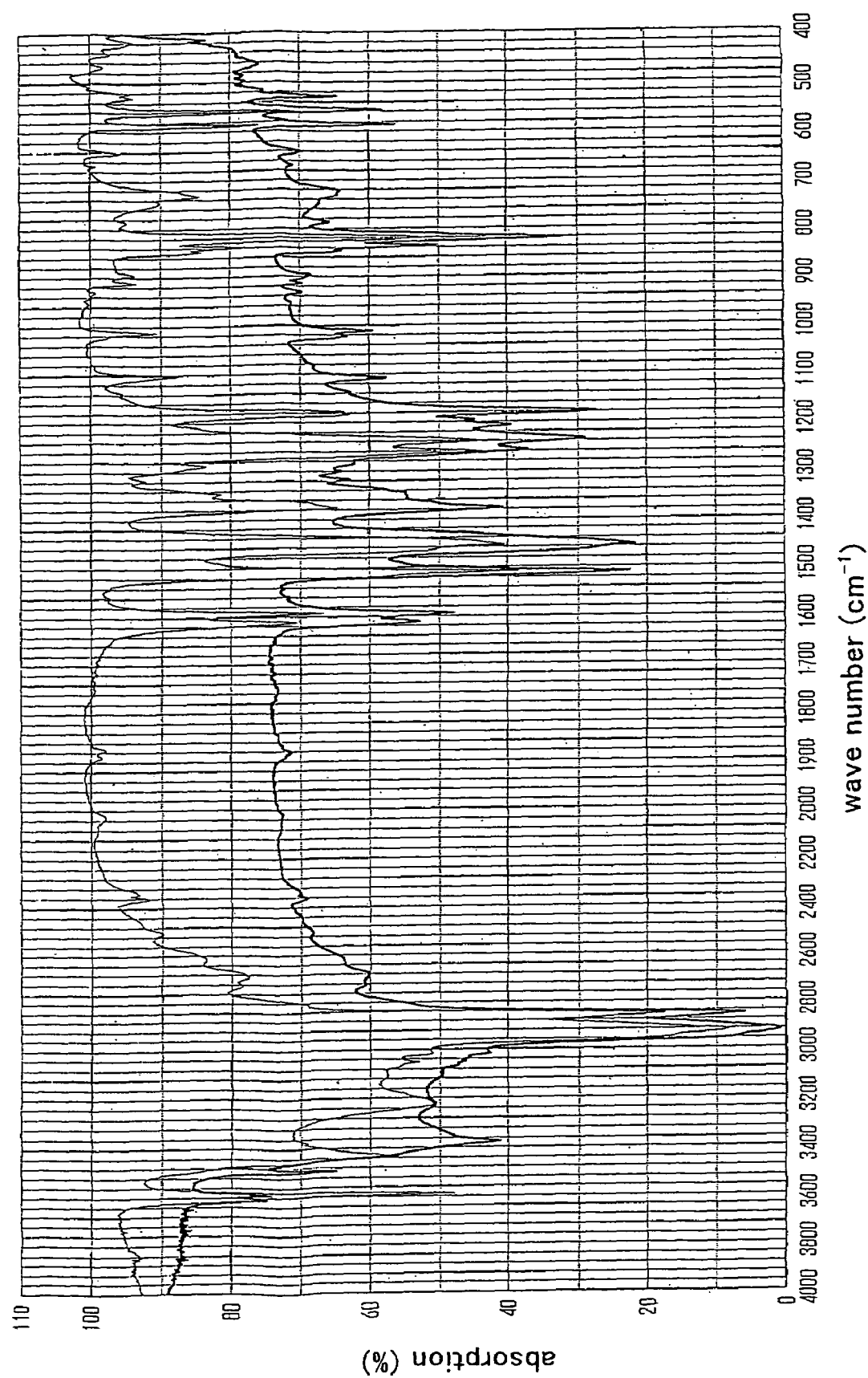
FIG. 24 is a graph showing the IR spectrum of FIG. 22 and IR spectrum of FIG. 23 superposed to each other.
Figure 25:
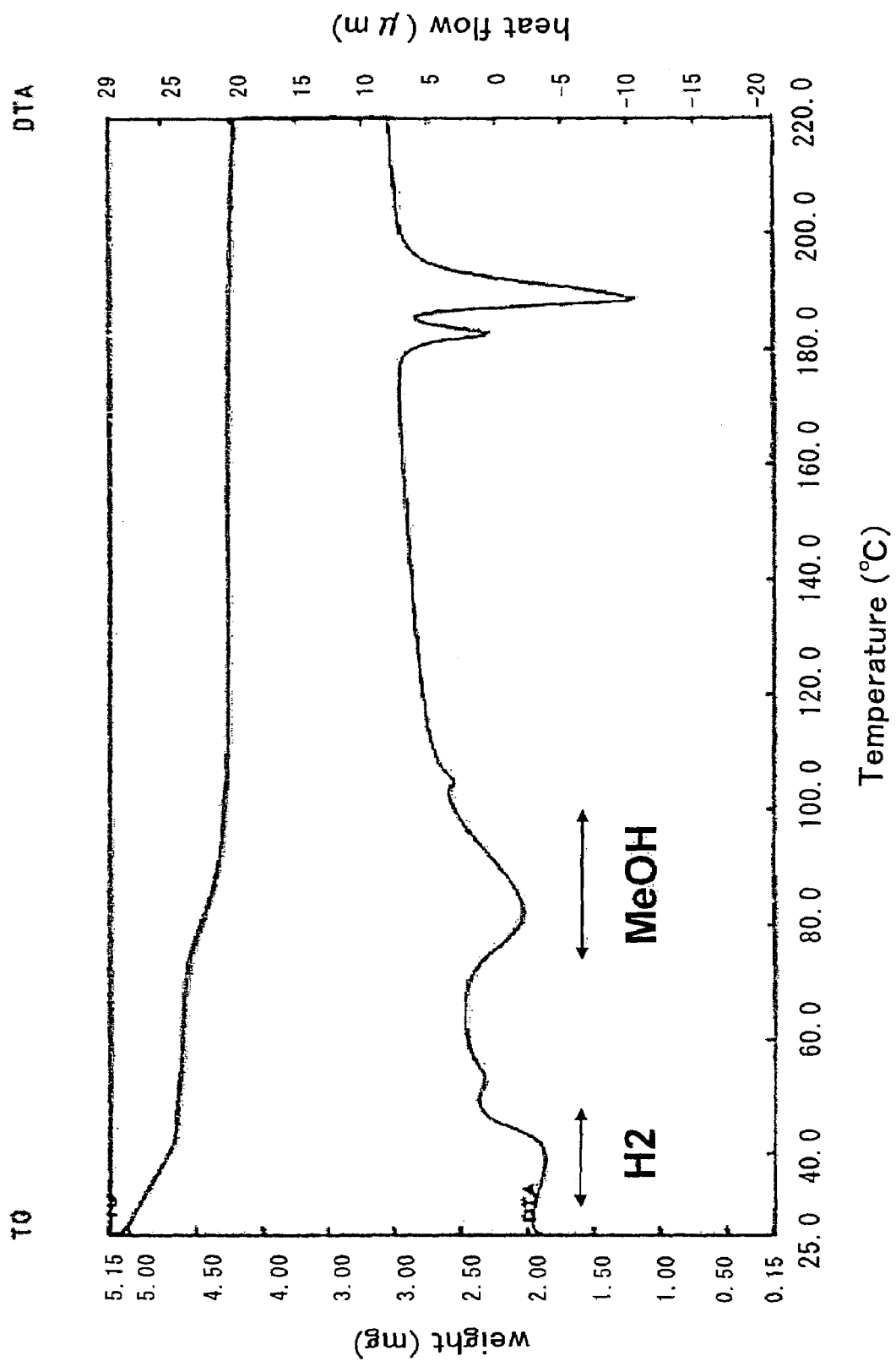
FIG. 25 is a graph showing TG-DTA detection curve of hydrogen clathrate (Cristalline A) prepared in Example 22.
Figure 26:
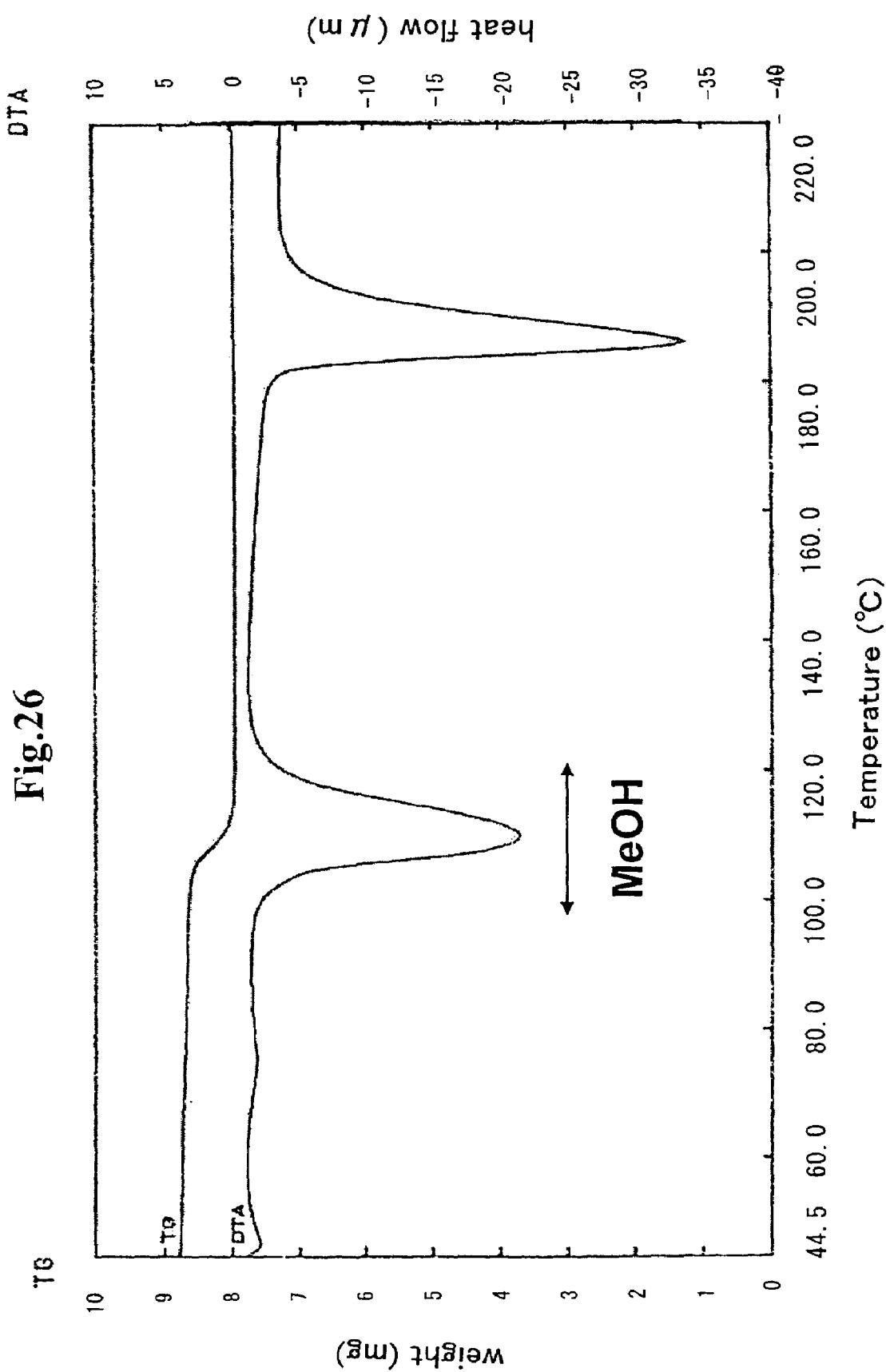
FIG. 26 is a graph showing TG-DTA detection curve of methanol clathrate (Cristalline B) prepared in Example 22.

In addition, TG-DTA measurements were made on the two different crystals. The measurement conditions were a temperature range from 25° C. to 500° C. and a temperature increasing rate of 10° C./minute. The result of Crystal A is shown in FIG. 23 and the result of Crystal B is shown in FIG. 24. As a result, it was found that Crystal B has a component (it may be methanol) which evaporates in a temperature range of 80° C. to 110° C. and Crystal A has components which evaporate in two stages of a temperature range less than 50° C. and a temperature range around 80° C. This means that Crystal A has a component which evaporates in a temperature range less than 50° C. and which was not found in Crystal B.

From these results, we can estimate that Crystal A is a clathrate consisting of three components of BHC (as the host compound)-hydrogen-methanol (BHC/hydrogen/methanol=1/10/1 (mole ratio)) and that hydrogen is emitted at a temperature of around 40° C. to 50° C.

[Validation of Characteristics of Hydrogen Clathrate]

(1) After the produced hydrogen clathrate (Crystal A) was put on a glass container and was left at ordinary temperature and ambient pressure for two days, IR spectrum measurement and TG-DTA measurement were conducted again. The results were almost the same as the results of the measurements before being left. It was confirmed that hydrogen can be stably stored.

(2) As the produced hydrogen clathrate (Crystal A) was put in a glass container and heated in hot water bath to a temperature of 50° C., hydrogen was emitted, whereby 0.06 g of hydrogen could be collected from 1 g of hydrogen clathrate. This rate shows that 10 moles of hydrogen is enclosed relative to 1 mole of BHC.

(3) After crystals formed as a result of emission of hydrogen in (2) were dissolved in methanol in the same manner as mentioned above, hydrogen was bubbled and the methanol as solvent was vaporized so as to obtain crystals. These crystals were air-dried in the same manner as Example 20. After that, IR spectrum measurement and TG-DTA measurement were conducted. The results were almost the same as the results of the measurements of Crystal A. It was confirmed that it is possible to enclose and store hydrogen again.

(4) As the hydrogen clathrate formed as a result of enclosure of hydrogen in (3) was heated in the same manner as (2), hydrogen was emitted, whereby 0.06 g of hydrogen could be collected from 1 g of hydrogen clathrate.

From these results, it was confirmed that the host compound after emitting hydrogen once enclosed therein can enclose hydrogen in substantially the same amount again and can emit the hydrogen again.

As described in detail, the hydrogen clathrate and the production method thereof of the present invention can exhibit the following excellent effects:

i) can store hydrogen at ordinary temperature and at ambient pressure;
ii) can store and transport hydrogen in relatively compact and light form, without necessity of a pressure tight vessel, a cryogenic vessel, and the like;
iii) can emit stored hydrogen at a relatively low temperature around 50° C.;
iv) can store hydrogen not only from hydrogen gas but also from mixed gas by the selective enclosure of hydrogen molecules in the mixed gas;
v) can reuse host compound after enclosed hydrogen is emitted by heating because the host compound reacts with hydrogen by contact to form a hydrogen clathrate again;
vi) achieve the selective storage of hydrogen only by bring the host compound in contact with mixed gas containing hydrogen because the host compound after enclosed hydrogen is emitted by heating has improved selective enclosure capacity; and
vii) can collect hydrogen as energy resource from such hydrogen containing gas that is produced in various industrial processes and, in the present circumstances, is discharged out of a system after being diluted, just by bringing host compound in contact with the gas.

What is claimed is:

1. A method for storing hydrogen, said method comprising a step wherein organic compound is brought into contact with hydrogen gas at a predetermined pressure, wherein said organic compound is capable of forming a hydrogen molecular compound by being brought into contact with hydrogen gas, and wherein said molecular compound is hydrogen clathrate containing said organic compound as a host compound.

2. A method for storing hydrogen according to claim 1, wherein said organic compound is at least one selected from the group consisting of monomolecular type host compounds, multimolecular type host compounds, and high-molecular type host compounds.

3. A method for storing hydrogen according to claim 2, wherein said monomolecular type host compound is at least one selected from the group consisting of cyclodextrins, crown ethers, cryptands, cyclophanes, azacyclophanes, calixarenes, cyclotriveratrylenes, spherands, and cyclic oligopeptides.

4. A method for storing hydrogen according to claim 3, wherein said multimolecular type host compound is at least one selected from the group consisting of ureas, thioureas, deoxycholates, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakis phenols, polyphenols, naphthols, bis-naphthols, diphenylmehanols, carboxylic amides, thioamides, bixanthene, carboxylic acids, imidazoles, hydroquinones, organic phosphorus compound, and organic silicon compound.

5. A method for storing hydrogen according to claim 4, wherein said multimolecular type host compound is at least one selected from the group consisting of urea, 1,1,6,6-tetraphenyl-2,4-hexadiyn-1,6-diol, 1,1-bis(2,4-dimethylphenyl)-2-propyn-1-ol, 1,1,4,4-tetraphenyl-2-butyne-1,4-diol, 1,1,6,6-tetrakis(2,4-dimethylphenyl)-2,4-hexadiyn-1,6-diol, 9,10-diphenyl-9,10-dihydroanthracene-9,10-diol, 9,10-bis(4-methylphenyl)-9,10-dihydroanthracene-9,10-diol, 1,1,2,2-tetraphenylethane-1,2-diol, 4-methoxyphenol, 2,4-dihydroxybenzophenone, 4,4'-dihydroxybenzophenone, 2,2'-dihydroxybenzophenone, 2,2',4,4'-tetrahydroxybenzophenone, 1,1-bis(4-hydroxyphenyl)cyclohexane, 4,4'-sulfonyl bisphenol, 2,2'-methylene bis(4-methyl-6-t-butylphenol), 4,4'-ethylidene bisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis(3-fluoro-4-hydroxyphenyl)ethane, α, α, α', α'-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetra acetoxy-9,9'-bi-9H-xanthene, 3,6,3',6'-tetrahydroxy-9,9'-bi-9H-xanthene, gallic acid, methyl gallate, catechin, bis-β-naphthol, α, α, α', α'-tetraphenyl-1,1'-biphenyl-2,2'-dimethanol, bis-dicyclohexylamide diphenirate, bis-dicyclohexylamide fumarate, cholic acid, deoxycholic acid, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis(3-carboxyphenyl)ethane, acetylene dicarboxyl acid, 2,4,5-triphenyl imidazole, 1,2,4,5-tetraphenyl imidazole, 2-phenyl phenanthro[9,10-d]imidazole, 2-(o-cyanophenyl)phenanthro [9,10-d]imidazole, 2-(m-cyanophenyl)phenanthro [9,10-d]imidazole, 2-(p-cyanophenyl)phenanthro[9,10-d]imidazole, hydroquinone, 2-t-butyl hydroquinone, 2,5-di-t-butyl hydroquinone, 2,5-bis(2,4-dimethylphenyl)hydroquinone, and tri-m-trylphosphine.

6. A method for storing hydrogen according to claim 5, wherein said multi molecular type host compound is at least one selected from the group consisting of 1,1-bis(4-hydroxyphenyl)cyclohexane, 1,1,2,2-tetrakis(4-hydroxyphenyl)ethane, 1,1,2,2-tetrakis(4-hydroxyphenyl)ethylene, tetrakis(p-methoxyphenyl)ethylene, tetrakis(p-iodophenyl)ethylene, 9,9'-bianthryl and 1,1,2,2-tetraphenylethane, bis(dicyclohexylamide)diphenirate, bis-dicyclohexylamide fumarate, α, α, α', α'-tetraphenyl-1,1'-biphenyl-2,2'-dimethanol, 1,1,6,6-tetraphenyl-2,4-hexadiyn-1,6-diol, and 2-(m-cyanophenyl)phenanthro[9,10-d]imidazole.

7. A method for storing hydrogen according to claim 2, wherein said high-molecular type host compound is at least one selected from the group consisting of celluloses, starchs, chitins, chitosans, polyvinyl alcohols, polymers of polyethylene glycol arm type of which core is 1,1,2,2-tetrakis phenyl ethane, and polymers of polyethylene glycol arm type of which core is α, α, α', α'-tetrakis phenyl xylene.

8. A method for storing hydrogen according to claim 1, wherein said organic compound is at least one selected from the group consisting of aromatic compounds, amide compounds, alcohol compounds, imidazole compounds, hydroquinones, ureas, corboxilic acids, cyclodextrins, polyphenols, cholic acids, celluloses, and organic phosphorous compounds.

9. A method for storing hydrogen according to claim 8, wherein said aromatic compounds are phenolic compounds.

10. A method for storing hydrogen according to claim 1, wherein hydrogen gas is brought into contact with said organic compound at a pressure of higher than 0.1 MPa.

11. A method for storing hydrogen according to claim 1, wherein hydrogen gas is brought into contact with said organic compound at a pressure between 0.1 MPa and 200 MPa.

12. Hydrogen clathrate enclosing hydrogen which is formed by contact reaction between a host compound and hydrogen, wherein said host compound is monomolecular host compound, wherein said monomolecular host compound is at least one selected from the group consisting of cyclodextrins, crown ethers, cryptands, cyclophanes, azacyclophanes, calixarenes, cyclotriveratrylenes, spherands, and cyclic oligopeptides.

13. Hydrogen clathrate enclosing hydrogen which is formed by contact reaction between a host compound and hydrogen, wherein said host compound is multimolecular host compound wherein said multimolecular host compound is at least one selected from the group consisting of ureas, thioureas, deoxycholates, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakis phenolbase, polyphenols, naphthols, bis-naphthols, diphenylmehanols, carboxylic amides, thioamides, bixanthene, carboxylic acids, imidazoles, hydroquinones, organic phosphorus compound, and organic silicon compound.

14. Hydrogen clathrate according to claim 13, wherein said multimolecular host compound is at least one selected from the group consisting of 1,1,6,6-tetraphenyl-2,4-hexadiyn-1,6-diol, 1,1-bis(2,4-dimethylphenyl)-2-propyn-1-ol, 1,1,4,4-tetraphenyl-2-butyne-1,4-diol, 1,1,6,6-tetrakis(2,4-dimethylphenyl)-2,4-hexadiyn-1,6-diol, 9,10-diphenyl-9,10-dihydroanthracene-9,10-diol, 9,10-bis(4-methylphenyl)-9,10-dihydroanthracene-9,10-diol, 1,1,2,2-tetraphenylethane-1,2-diol, 4-methoxyphenol, 2,4-dihydroxybenzophenone, 4,4'-dihydroxybenzophenone, 2,2'-dihydroxybenzophenone, 2,2',4,4'-tetrahydroxybenzophenone, 1,1-bis(4-hydroxyphenyl)cyclohexane, 4,4'-sulfonyl bisphenol, 2,2'-methylene bis(4-methyl-6-t-butylphenol), 4,4'-ethylidene bisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis(3-fluoro-4-hydroxyphenyl)ethane, α, α, α', α'-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetra acetoxy-9,9'-bi-9H-xanthene, 3,6,3',6'-tetrahydroxy-9,9'-bi-9H-xanthene, gallic acid, methyl gallate, catechin, bis-β-naphthol, α, α, α', α'-tetraphenyl-1,1'-biphenyl-2,2'-dimethanol, bis-dicyclohexylamide diphenirate, bis-dicyclohexylamide fumarate, cholic acid, deoxycholic acid, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis(3-carboxyphenyl)ethane, acetylene dicarboxyl acid, 2,4,5-triphenyl imidazole, 1,2,4,5-tetraphenyl imidazole, 2-phenyl phenanthro[9,10-d]imidazole, 2-(o-cyanophenyl)phenanthro[9,10-d]imidazole, 2-(m-cyanophenyl)phenanthro[9,10-d]imidazole, 2-(p-cyanophenyl)phenanthro[9,10-d]imidazole, hydroquinone, 2-t-butyl hydroquinone, 2,5-di-t-butyl hydroquinone, 2,5-bis(2,4-dimethylphenyl) hydroquinone, and tri-m-trylphosphine.

15. Hydrogen clathrate according to claim 14, wherein said multi molecular host compound is at least one selected from the group consisting of 1,1-bis(4-hydroxyphenyl)cyclohexane, 1,1,2,2-tetrakis(4-hydroxyphenyl)ethane, 1,1,2,2-tetrakis(4-hydroxyphenyl)ethylene, tetrakis(p-methoxyphenyl)ethylene, tetrakis(p-iodophenyl)ethylene, 9,9'-bianthryl, 1,1,2,2-tetraphenylethane, bis(dicyclohexylamide)diphenirate, bis-dicyclohexylamide fumarate, α, α, α', α'-tetraphenyl-1,1'-biphenyl-2,2'-dimethanol and 1,1,6,6-tetraphenyl-2,4-hexadiyn-1,6-diol, and 2-(m-cyanophenyl)phenanthro[9,10-d]imidazole.

16. Hydrogen clathrate enclosing hydrogen which is formed by contact reaction between a host compound and hydrogen, wherein said host compound is high-molecular host compound, wherein said high-molecular host compound is at least one selected from the group consisting of celluloses, starchs, chitins, chitosans, polyvinyl alcohols, polymers of polyethylene glycol arm type of which core is 1,1,2,2-tetrakis phenyl ethane, and polymers of polyethylene glycol arm type of which core is α, α, α', α'-tetrakis phenyl xylene.

17. Hydrogen clathrate enclosing hydrogen which is formed by contact reaction between a host compound and hydrogen, wherein said host compound inorganic host compound, wherein said inorganic host compound is at least one selected from the group consisting of clay minerals, monomorillonites, and zeolites.

18. Hydrogen clathrate enclosing hydrogen which is formed by contact reaction between a host compound and hydrogen, wherein said host compound is at least one selected from the group consisting of aromatic compounds, amide compounds, alcohol compounds, imidazole compounds, hydroquinones, ureas, corboxilic acids, cyclodextrins, polyphenols, cholic acids, celluloses, and organic phosphorous compounds.

19. Hydrogen clathrate according to claim 18, wherein said aromatic compounds are phenolic compounds.

20. A production method of a hydrogen clathrate comprising
a step of dissolving a host compound into a solvent, and a step of recrystallizing the host compound with injecting hydrogen into the solvent, and inserting hydrogen molecules into crystal lattice of the host compound.

21. A production method of a hydrogen clathrate according to claim 20, wherein said host compound is at least one selected from the group consisting of monomolecular host compounds, multimolecular host compounds, and high-molecular host compounds and inorganic host compounds.

22. A production method of a hydrogen clathrate according to claim 21, wherein said monomolecular host compounds is at least one selected from the group consisting of cyclodextrins, crown ethers, cryptands, cyclophanes, azacyclophanes, calixarenes, cyclotriveratrylenes, spherands, and cyclic oligopeptides.

23. A production method of a hydrogen clathrate according to claim 22, wherein said multimolecular host compound is at least one selected from the group consisting of ureas, thioureas, deoxycholates, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakis phenolbase, polyphenols, naphthols, bis-naphthols, diphenylmehanols, carboxylic amides, thioamides, bixanthene, carboxylic acids, imidazoles, hydroquinones, organic phosphorus compound, and organic silicon compound.

24. A production method of a hydrogen clathrate according to claim 23, wherein said multimolecular host compound is at least one selected from the group consisting of urea, 1,1,6,6-tetraphenyl-2,4-hexadiyn-1,6-diol, 1,1-bis(2,4-dimethylphenyl)-2-propyn-1-ol, 1,1,4,4-tetraphenyl-2-butyne-1,4-diol, 1,1,6,6-tetrakis(2,4-dimethylphenyl)-2,4-hexadiyn-1,6-diol, 9,10-diphenyl-9,10-dihydroanthracene-9,10-diol, 9,10-bis(4-methylphenyl)-9,10-dihydroanthracene-9,10-diol, 1,1,2,2-tetraphenylethane-1,2-diol, 4-methoxyphenol, 2,4-dihydroxybenzophenone, 4,4'-dihydroxybenzophenone, 2,2'-dihydroxybenzophenone, 2,2',4,4'-tetrahydroxybenzophenone, 1,1-bis(4-hydroxyphenyl)cyclohexane, 4,4'-sulfonyl bisphenol, 2,2'-methylene bis(4-methyl-6-t-butylphenol), 4,4'-ethylidene bisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis(3-fluoro-4-hydroxyphenyl)ethane, α, α, α', α'-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetra acetoxy-9,9'-bi-9H-xanthene, 3,6,3',6'-tetrahydroxy-9,9'-bi-9H-xanthene, gallic acid, methyl gallate, catechin, bis-β-naphthol, α, α, α', α'-tetraphenyl-1,1'-biphenyl-2,2'-dimethanol, bis-dicyclohexylamide diphenirate, bis-dicyclohexylamide fumarate, cholic acid, deoxycholic acid, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis(3-carboxyphenyl)ethane, acetylene dicarboxyl acid, 2,4,5-triphenyl imidazole, 1,2,4,5-tetraphenyl imidazole, 2-phenyl phenanthro[9,10-d]imidazole, 2-(o-cyanophenyl)phenanthro[9,10-d]imidazole, 2-(m-cyanophenyl)phenanthro[9,10-d]imidazole, 2-(p-cyanophenyl)phenanthro[9,10-d]imidazole, hydroquinone, 2-t-butyl hydroquinone, 2,5-di-t-butyl hydroquinone, 2,5-bis(2,4-dimethylphenyl)hydroquinone, and tri-m-trylphosphine.

25. A production method of a hydrogen clathrate according to claim 24, wherein said multi molecular host compound is at least one selected from the group consisting of 1,1-bis(4-hydroxyphenyl)cyclohexane, 1,1,2,2-tetrakis(4-hydroxyphenyl)ethane, 1,1,2,2-tetrakis(4-hydroxyphenyl)ethylene, tetrakis(p-methoxyphenyl)ethylene, tetrakis(p-iodophenyl)ethylene, 9,9'-bianthryl, 1,1,2,2-tetraphenylethane, bis(dicyclohexylamide)diphenirate, bis-dicyclohexylamide fumarate, α, α, α', α'-tetraphenyl-1,1'-biphenyl-2,2'-dimethanol and 1,1,6,6-tetraphenyl-2,4-hexadiyn-1,6-diol, and 2-(m-cyanophenyl)phenanthro[9,10-d]imidazole.

26. A production method of a hydrogen clathrate according to claim 21, wherein said high-molecular host compound is at least one selected from the group consisting of celluloses, starchs, chitins, chitosans, polyvinyl alcohols, polymers of polyethylene glycol arm type of which core is 1,1,2,2-tetrakis phenyl ethane, and polymers of polyethylene glycol arm type of which core is α, α, α', α'-tetrakis phenyl xylene.

27. A production method of a hydrogen clathrate according to claim 21, wherein said inorganic host compound is at least one selected from the group consisting of clay minerals, montmorillonites, and zeolites.

28. A production method of a hydrogen clathrate as claimed in claim 20, wherein said host compound is a multimolecular host compound including phenolic host compound, and wherein the solvent is at least one selected from the group consisting of alcohols including methanol and ethanol, ketones including acetone and methyl ethyl ketone, esters including ethyl acetate, ethers including diethyl ether and dibutyl ether, furans including etrahydrofuran, amides including dimethyl acetamide, and aldehydes including acetaldehyde and benzaldehyde.

29. A production method of a hydrogen clathrate comprising a step of bringing hydrogen gas into contact with a host compound in a pressurized state, wherein said host compound is monomolecular host compound, wherein said monomolecular compound is at least one selected from the group consisting of cyclodextrins, crown ethers, cryptands, cyclophanes, azacyclophanes, calixarenes, cyclotriveratrylenes, spherands, and cyclic oligopeptides.

30. A production method of a hydrogen clathrate comprising a step of bringing hydrogen gas into contact with a host compound in a pressurized state, wherein said host compound multimolecular host compound, wherein said multimolecular host compound is at least one selected from the group consisting of ureas, thioureas, deoxycholates, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakis phenol-base, polyphenols, naphthols, bis-naphthols, diphenylmehanols, carboxylic amides, thioamides, bixanthene, carboxylic acids, imidazoles, hydroquinones, organic phosphorus compound, and organic silicon compound.

31. A production method of a hydrogen clathrate according to claim 30, wherein said multimolecular host compound is at least one selected from the group consisting of urea, 1,1,6,6-tetraphenyl-2,4-hexadiyn-1,6-diol, 1,1-bis(2,4-dimethylphenyl)-2-propyn-1-ol, 1,1,4,4-tetraphenyl-2-butyne-1,4-diol, 1,1,6,6-tetrakis(2,4-dimethylphenyl)-2,4-hexadiyn-1,6-diol, 9,10-diphenyl-9,10-dihydroanthracene-9,10-diol, 9,10-bis(4-methylphenyl)-9,10-dihydroanthracene-9,10-diol, 1,1,2,2-tetraphenylethane-1,2-diol, 4-methoxyphenol, 2,4-dihydroxybenzophenone, 4,4'-dihydroxybenzophenone, 2,2'-dihydroxybenzophenone, 2,2',4,4'-tetrahydroxybenzophenone, 1,1-bis(4-hydroxyphenyl)cyclohexane, 4,4'-sulfonyl bisphenol, 2,2'-methylene bis(4-methyl-6-t-butylphenol), 4,4'-ethylidene bisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis (3-fluoro-4-hydroxyphenyl)ethane, α, α, α', α'-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetra acetoxy-9,9'-bi-9H-xanthene, 3,6,3',6'-tetrahydroxy-9,9'-bi-9H-xanthene, gallic acid, methyl gallate, catechin, bis-β-naphthol, α, α, α', α'-tetraphenyl-1,1'-biphenyl-2,2'-dimethanol, bis-dicyclohexylamide diphenirate, bis-dicyclohexylamide fumarate, cholic acid, deoxycholic acid, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis(3-carboxyphenyl)ethane, acetylene dicarboxyl acid, 2,4,5-triphenyl imidazole, 1,2,4,5-tetraphenyl imidazole, 2-phenyl phenanthro[9,10-d]imidazole, 2-(o-cyanophenyl)phenanthro[9,10-d]imidazole, 2-(m-cyanophenyl)phenanthro[9,10-d]imidazole, 2-(p-cyanophenyl) phenanthro[9,10-d]imidazole, hydroquinone, 2-t-butyl hydroquinone, 2,5-di-t-butyl hydroquinone, 2,5-bis(2,4-dimethylphenyl)hydroquinone, and tri-m-trylphosphine.

32. A production method of a hydrogen clathrate according to claim 31, wherein said multi molecular host compound is at least one selected from the group consisting of 1,1-bis(4-hydroxyphenyl)cyclohexane, 1,1,2,2-tetrakis(4-hydroxyphenyl)ethane, 1,1,2,2-tetrakis(4-hydroxyphenyl) ethylene, tetrakis(p-methoxyphenyl)ethylene, tetrakis(p-iodophenyl)ethylene, 9,9'-bianthryl and 1,1,2,2-tetraphenylethane, bis(dicyclohexylamide)diphenirate, bis-dicyclohexylamide fumarate, α, α, α', α'-tetraphenyl-1,1'-biphenyl-2,2'-dimethanol, 1,1,6,6-tetraphenyl-2,4-hexadiyn-1,6-diol, and 2-(m-cyanophenyl)phenanthro[9,10-d]imidazole.

33. A production method of a hydrogen clathrate comprising a step of bringing hydrogen gas into contact with a host compound in a pressurized state, wherein said host compound is high-molecular host compound, wherein said high-molecular host compound is at least one selected from the group consisting of celluloses, starchs, chitins, chitosans, polyvinyl alcohols, polymers of polyethylene glycol arm type of which core is 1,1,2,2-tetrakis phenyl ethane, and polymers of polyethylene glycol arm type of which core is α, α, α', α'-tetrakis phenyl xylene.

* * * * *